(12) United States Patent
Smith et al.

(10) Patent No.: US 10,826,132 B2
(45) Date of Patent: Nov. 3, 2020

(54) LONG-LIFE RECHARGEABLE ION BATTERIES HAVING ION RESERVOIRS

(71) Applicant: Alliance for Sustainable Energy, LLC, Golden, CO (US)

(72) Inventors: Kandler Alan Smith, Golden, CO (US); Jeremy Stephan Neubauer, Sunnyvale, CA (US); Shriram Santhanagopalan, Broomfield, CO (US); Andrew Michael Colclasure, Morrison, CO (US); Lei Cao, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 47 days.

(21) Appl. No.: 15/685,485

(22) Filed: Aug. 24, 2017

(65) Prior Publication Data
US 2018/0062214 A1    Mar. 1, 2018

Related U.S. Application Data

(60) Provisional application No. 62/379,453, filed on Aug. 25, 2016.

(51) Int. Cl.
*H01M 10/42* (2006.01)
*H01M 10/05* (2010.01)
*H01M 10/0525* (2010.01)

(52) U.S. Cl.
CPC ....... *H01M 10/4242* (2013.01); *H01M 10/05* (2013.01); *H01M 10/0525* (2013.01)

(58) Field of Classification Search
None
See application file for complete search history.

(56) References Cited

U.S. PATENT DOCUMENTS

| 6,335,115 B1 | 1/2002 | Meissner |
| 7,726,975 B2 | 6/2010 | Christensen et al. |
| | (Continued) | |

FOREIGN PATENT DOCUMENTS

| DE | 195 28 049 A1 | 2/1997 |
| DE | 10 2014 225452 A1 | 6/2016 |
| | (Continued) | |

OTHER PUBLICATIONS

Daniel, "Materials and Processing for Lithium-ion Batteries", JOM, Sep. 2008, vol. 60, No. 9, pp. 43-48.
(Continued)

*Primary Examiner* — Ula C Ruddock
*Assistant Examiner* — Tony S Chuo
(74) *Attorney, Agent, or Firm* — Michael A. McIntyre

(57) ABSTRACT

An aspect of the present disclosure is an electrochemical device that includes a first electrode, an ion reservoir electronically connected to the electrode by a first circuit, an electrolyte positioned between the first electrode and the ion reservoir and ionically connecting the first electrode and the ion reservoir, and a regulating element, where the regulating element is positioned between the first electrode and the ion reservoir, the regulating element electronically and/or ionically connects the ion reservoir and the first electrode, and (Continued)

the regulating element limits the transfer of at least one of electrons and/or ions between the ion reservoir and the first electrode.

16 Claims, 30 Drawing Sheets

(56) References Cited

U.S. PATENT DOCUMENTS

| | | | |
|---|---|---|---|
| 7,846,571 | B2 | 12/2010 | Christensen et al. |
| 9,048,505 | B2 | 6/2015 | Christensen et al. |
| 9,166,222 | B2 | 10/2015 | Amiruddin et al. |
| 9,281,526 | B1 | 3/2016 | Liu et al. |
| 2005/0175877 | A1 | 8/2005 | Hong |
| 2006/0093871 | A1* | 5/2006 | Howard ............... H01M 4/131 429/9 |
| 2008/0003490 | A1 | 1/2008 | Christensen et al. |
| 2013/0113495 | A1 | 5/2013 | Kim et al. |
| 2013/0224538 | A1 | 8/2013 | Jansen et al. |
| 2014/0370405 | A1 | 12/2014 | Zhang et al. |
| 2015/0004444 | A1 | 1/2015 | Christensen et al. |
| 2015/0171398 | A1* | 6/2015 | Roumi ............... H01M 2/1673 429/7 |
| 2016/0006081 | A1 | 1/2016 | Eaglesham et al. |

FOREIGN PATENT DOCUMENTS

| | | |
|---|---|---|
| EP | 0 296 589 A2 | 12/1988 |
| WO | WO 2014/055671 A1 | 4/2014 |
| WO | WO 2016/004320 A2 | 1/2016 |

OTHER PUBLICATIONS

Liu et al., "Aging Mechanisms of LiFePO4 Batteries Deduced by Electrochemical and Structural Analyses", Journal of The Electrochemical Society, 2010, vol. 157, No. 4, pp. A499-A507.
Liu, "Analysis and Modeling of Lithium Ion Batteries", Sensors and Materials Laboratory, HRL Laboratories LLC, 2010, pp. 1-45.
Ramadass et al., "Mathematical Modeling of the Capacity Fade of Li-ion Cells", Journal of Power Sources, 2003, vol. 123, 230.
Verbrugge et al., "Generalized Recursive Algorithm for Adaptive Multiparameter Regression Application to Lead Acid, Nickel Metal Hydride, and Lithium-Ion Batteries", Journal of the Electrochemical Society, 2006, vol. 153, No. 1, pp. A187-A201.
Vetter et al., "Ageing Mechanisms in Lithium-ion Batteries", Journal of Power Sources, 2005, vol. 147, pp. 269-281.
Wang et al., "Active Lithium Replenishment to Extend the Life of a Cell Employing Carbon and Iron Phosphate Electrodes", Journal of Power Sources, 2011, vol. 196, pp. 5966-5969.
Yakovleva, "Stabilized Lithium Metal Powder, SLMP® for Advanced Li-ion, Beyond Li-ion and Li-ion Capacitor Technologies", FMC Lithium, IBA 2013, Barcelona, Mar. 13, 2013, pp. 1-16, available at https://congresses.icmab.es/iba2013/images/files/Wednesday/Morning/Marina%20Yakovleva.pdf.
International Search Report and Written Opinion for International (PCT) Patent Application No. PCT/US2017/048411, dated Oct. 27, 2017, pp. 1-9.
Supplementary Partial European Search Report for European Patent Application No. 17 84 4414, dated Apr. 8, 2020, pp. 1-18.

* cited by examiner

LONG-LIFE RECHARGEABLE ION BATTERIES HAVING ION RESERVOIRS

CROSS-REFERENCE TO RELATED APPLICATIONS

This application claims the benefit of U.S. Provisional Patent Application No. 62/379,453 filed on Aug. 25, 2016, the contents of which are incorporated herein by reference in their entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Low-cost energy storage promises to make carbon-free renewable solar- and wind-generated energy readily available on the electric grid, as well as put more electric vehicles (EVs) on the road. However, today's 10-year lifespan of batteries for these applications cannot compete with the 20- to 30-year lifetime of fossil-fueled power-peaking plants or the 15- to 20-year lifetime of conventional petroleum-powered vehicles. Lithium (Li) loss capacity fade plagues today's Li-ion battery technologies, shortening lifespan and restricting performance.

The cost of Li-ion energy storage systems, presently around $325/kWh, is expected to fall by 45% in the next five years, outpacing most competing storage technologies presently under development. But even if costs are brought below $200/kWh, limited Li-ion lifetime will still impede widespread market acceptance of large-scale storage. Now that multiple grid-based energy storage demonstration projects are underway and numerous EVs powered with Li-ion batteries are on the road, technical and economic analyses are increasingly looking beyond upfront expenses and seeking to optimize energy storage total life-cycle costs.

Although the 10-year lifetime of today's Li-ion batteries is long compared to that of historical electrochemical technologies, this lifespan is only achieved by restricting battery performance in the following ways:

Typically only 65% of the system's total energy is used on a daily basis;

Average operational temperatures must be maintained below 35° C. and cell-to-cell temperature differences kept to less than 5° C.; and The application must accommodate 30% capacity loss by year 10.

Thus, there is a need for new battery technologies that make it possible to increase battery calendar and cycle life by more than 50%, while substantially increasing useable energy and operating temperature ranges and reducing capacity degradation.

SUMMARY

An aspect of the present disclosure is an electrochemical device that includes a first electrode, an ion reservoir electronically connected to the electrode by a first circuit, an electrolyte positioned between the first electrode and the ion reservoir and ionically connecting the first electrode and the ion reservoir, and a regulating element, where the regulating element is positioned between the first electrode and the ion reservoir, the regulating element electronically and/or ionically connects the ion reservoir and the first electrode, and the regulating element limits the transfer of at least one of electrons and/or ions between the ion reservoir and the first electrode.

In some embodiments of the present disclosure, the ion reservoir may include a solid capable of being oxidized according to a first reaction that may include $M \leftrightarrow M^{n+} + ne^-$ having a first standard reduction potential $E_{St}^0$, where M may include an element, and n is an integer value greater than zero. In some embodiments of the present disclosure, the solid may include at least one of lithium, magnesium, aluminum, potassium, zinc, and/or vanadium. In some embodiments of the present disclosure, $M^{n+}$ may include at least one of $Li^+$, $Na^+$, $K^+$, $Fe^+$, $Cu^+$, $V^+$, and/or $Mg^{2+}$. In some embodiments of the present disclosure, the first electrode may behave as a cathode capable of being reduced according to a second reaction that may include $X + M^{n+} + ne^- \leftrightarrow MX$ having a second standard reduction potential $E_{cat}^0$, where X may include an element, and $E_{St}^0 < E_{cat}^0$. In some embodiments of the present disclosure, X may include at least one of $FePO_4$, $FeCl_3$, $Mn_2O_4$, $CoO_2$, sulfur, a $NiCoAlO_2$ alloy, a $NiMnCoO_2$ alloy, and/or a vanadate. In some embodiments of the present disclosure, the first reaction may include $Li \leftrightarrow Li^+ + e^-$ and $V_{St}^0$ may be about $-3.04$ V. In some embodiments of the present disclosure, the second reaction may include $FePO_4 + Li^+ + e^- \leftrightarrow LiFePO_4$ and $E_{cat}^0$ may be about 0.36 V.

In some embodiments of the present disclosure, the first electrode may behave as an anode capable of being oxidized according to a second reaction that may include $Y \leftrightarrow Y^{n+} + ne^-$ having a second standard reduction potential $E_{ano}^0$, Y may include an element, and $E_{St}^0 < E_{ano}^0$. In some embodiments of the present disclosure, Y may include at least one of carbon, silicon, tin, sodium, zinc, magnesium, vanadium, and/or $TiO_3$. In some embodiments of the present disclosure, the first reaction may include $Li \leftrightarrow Li^+ + e^-$ and $E_{cat}^0$ may be about $-3.04$ V. In some embodiments of the present disclosure, the second reaction may include $LiC_6 \leftrightarrow Li^+ + e^- + C$ and $E_{ano}^0$ may be about $-2.99$ V.

In some embodiments of the present disclosure, the ion reservoir may include a solid capable of being reduced according to a first reaction that may include $M + ne^- \leftrightarrow M^{n-}$ having a first standard reduction potential $E_{St}^0$, where M may include an element, and n is an integer value greater than zero. In some embodiments of the present disclosure, the first electrode may behave as a cathode capable of being reduced according to a second reaction that may include $MX + ne^- \leftrightarrow X + M^{n-}$ having a second standard reduction potential $E_{cat}^0$, where X may include an element, and $E_{St}^0 > E_{cat}^0$. In some embodiments of the present disclosure, the first electrode may behaves as a anode capable of being oxidized according to a second reaction that may include $Y + M^{n-} \leftrightarrow MY + n^{e-}$ having a second standard reduction potential $E_{cat}^0$, where Y may include an element, and $E_{St}^0 > E_{cat}^0$.

In some embodiments of the present disclosure, the regulating element may include at least one of a resistor and/or a diode. In some embodiments of the present disclosure, the regulating element may be positioned in the first circuit between the first electrode and the ion reservoir. In some embodiments of the present disclosure, the first electrode and the ion reservoir may be fluidly connected by a bridge containing the electrolyte. In some embodiments of the present disclosure, the regulating element may be positioned within the bridge and may limit the flow of ions from the ion reservoir to the first electrode.

An aspect of the present disclosure is a method that includes transferring ions to an electrode of an electrochemical device, wherein the transferring is accomplished by electronically and/or ionically connecting the electrode to an ion reservoir containing the ions, and positioning a regulating element between the electrode and the ion reservoir, where the regulating element limits the flow of the ions from the ion reservoir to the electrode, and the transferring extends the life of the electrochemical device. In some embodiments of the present disclosure, the transferring may include a continuous flow of ions from the ion reservoir to the electrode. In some embodiments of the present disclosure, the transferring of ions from the reservoir to the electrode may be triggered when a set-point for a parameter is attained or when the parameter is in a specific range. In some embodiments of the present disclosure, the parameter may include a charge capacity.

BRIEF DESCRIPTION OF DRAWINGS

Exemplary embodiments are illustrated in referenced figures of the drawings. It is intended that the embodiments and figures disclosed herein are to be considered illustrative rather than limiting.

REFERENCE NUMERALS

Figure 1:
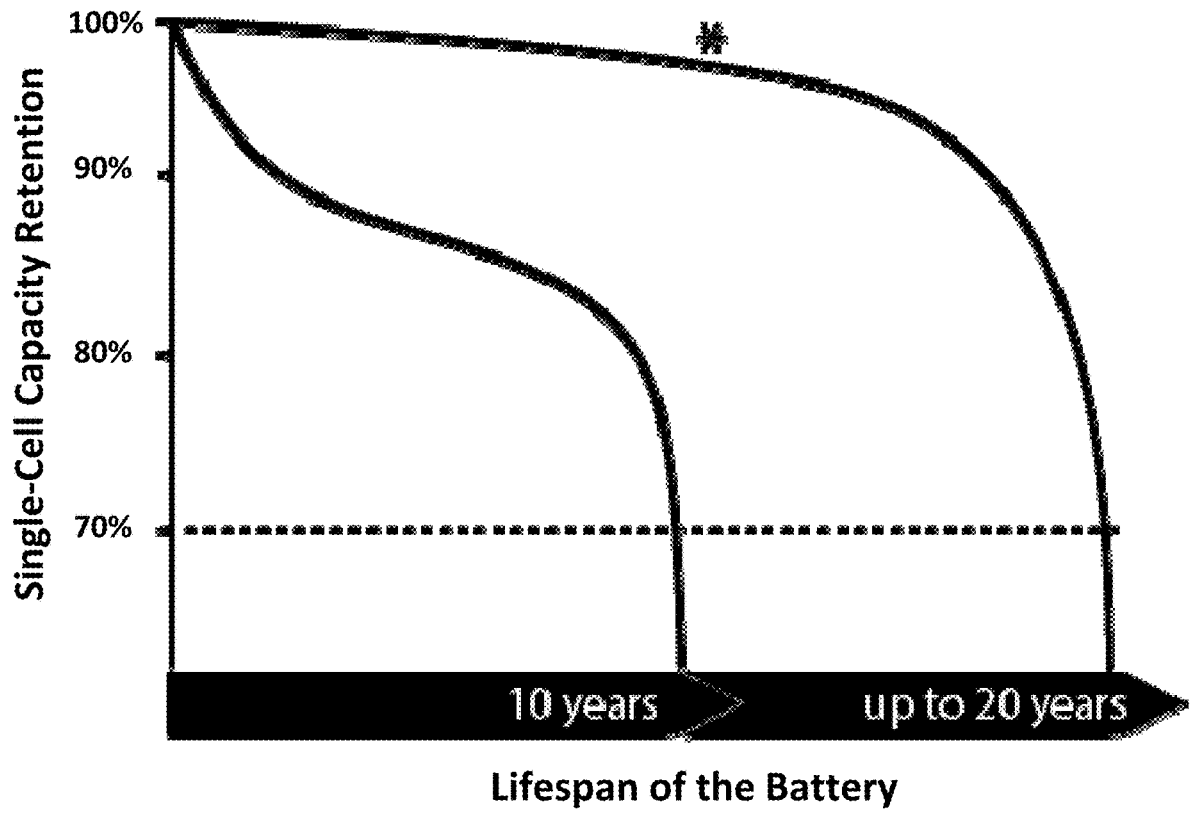
FIG. 1 illustrates predicted Li-ion battery life extension by limiting capacity fade, according to embodiments of the present disclosure.

100 . . . cell
110 . . . anode
120 . . . cathode
130 . . . electrolyte
140 . . . ion reservoir
150 . . . first circuit
152 . . . first terminal
154 . . . second terminal
156 . . . charger
158 . . . load
160 . . . second circuit
162 . . . third terminal
164 . . . fourth terminal
170 . . . electronic regulating element
180 . . . separator
190 . . . container
200 . . . electrolyte bridge
210 . . . ionic regulating element
900 . . . method
910 . . . start
920 . . . continuous releasing
930 . . . decision
940 . . . end
1000 . . . method
1010 . . . start
1020 . . . calculating
1030 . . . triggered releasing
1040 . . . decision
1050 . . . end

DETAILED DESCRIPTION

An aspect of the present disclosure is a passively triggered excess ion reservoir for rechargeable energy storage cells to overcome ion-loss capacity fade, where, when triggered, the ion reservoir replenishes the ions lost over time with additional ions stored in the reservoir. This technology may greatly improve the life cycle and utility of rechargeable battery systems, including cation-based (e.g. Li-based) and anion-based (e.g. halogen-based) energy storage systems for both utility and vehicle applications, potentially extending battery lifetimes by more than 50% while potentially adding less than 2% to today's cell cost. FIG. 1 illustrates potential life cycle gains, for an exemplary case of rechargeable lithium-ion batteries, made possible by some of the embodiments described in the present disclosure. The curve marked with the asterisk represents the potential life span gains that may be obtained in advanced Li-ion batteries using some embodiments of the present disclosure, for example metallic lithium released into the anode or cathode using a passive electrochemical trigger mechanism, as will be described in more detail below. The second curve of FIG. 1 (without the asterisk) represents an approximation of lifespans for today's typical Li-ion batteries.

Table 1 below further summarizes the potential benefits provided by the technology described herein, compared to present "state-of-the-art" Li-ion battery technologies. For the example of Li-ion cells, some embodiments of the present disclosure may provide dramatic increases in lifetime, depth-of-discharge, and power-to-energy ratios in comparison to other grid and automotive Li-ion systems.

TABLE 1

Li-ion technology: Present versus proposed

| Metric | Present State-of-the-Art | | Proposed |
| --- | --- | --- | --- |
| | Grid | Transportation | Long-Life System |
| Lifetime | 10 years | | 15 to 20 years |
| Depth-of-discharge | 65% | | 90% |
| Power-to-energy ratio | 10 kW/kWh | | 30% greater by relaxing thermal restrictions |
| Thermal management | Conditioned air | Chilled liquid | Ambient air |

While multiple degradation mechanisms exist, loss of ions is the dominant degradation mode that limits storage capacity, especially in current Li-ion technologies. For energy-dense battery systems such as Li-ion batteries, the working potential of the negative electrode (anode) is typically less than the reduction potential of the electrolyte, resulting in the formation of a passive solid-electrolyte interphase (SEI) film layer. As the SEI layer grows throughout the life of a battery, it consumes ions (e.g. $Li^+$) and reduces energy-storage capacity, with a rate of ion loss that increases exponentially with temperature. Currently, expensive thermal control systems are needed to limit the rate of SEI layer growth to extend the life of Li-ion batteries. Thermal control and restricted depth of discharge are needed to limit cycling damage to the SEI layer and to extend cycle life of the battery.

Thus, to off-set at least some of these losses, some embodiments of the present disclosure provide methods that consistently and controllably introduce additional ions, e.g. cations and/or anions, into the cell (e.g. battery). Again for the Li-ion example, in some embodiments, about 20% excess lithium may be provided in a rechargeable Li-ion battery to significantly increase its operating lifetime. Some embodiments of the present disclosure may provide improved rechargeable ion batteries capable of achieving the technical targets shown in Table 2, with relatively small corresponding increases to cost and/or volume, e.g. potentially less than 2% and ~5%, respectively, relative to current Li-ion batteries. The resultant performance and lifetime benefits of the device may greatly outweigh these increases, potentially reducing energy storage total life-cycle costs by 33% and 38% for grid and automotive applications, respectively.

TABLE 2

Technical targets and life-cycle cost benefits of Long-Life Li-Ion Battery

| Application | Technical target | Life-cycle cost benefit |
| --- | --- | --- |
| Grid, extended life | >50% increase in cycle life and calendar life | 33% lower cost over 30 year horizon |
| Automotive, 10 year/150k mile warranty | Utilization increased from 65% to 90% depth-of-discharge | 38% lower cost through downsized energy content |
| | Acceptable cell-to-cell temperature difference increased from 5° C. to 15° C. | 5% lower cost by eliminating liquid cooling |

Figure 2:
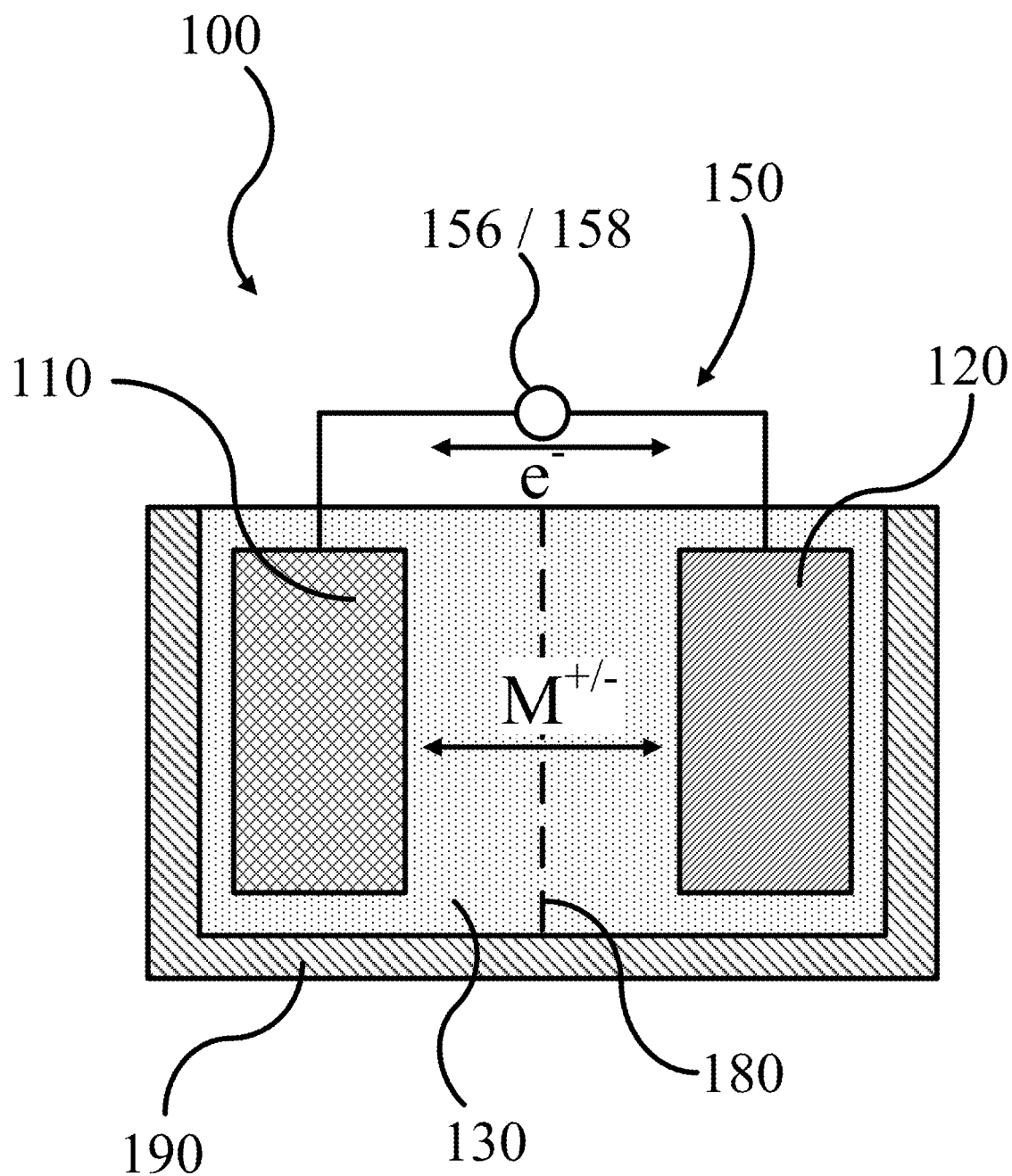
FIG. 2 illustrates a rechargeable ion battery, according to embodiments of the present disclosure.

FIG. 2 illustrates a cell 100 that includes an anode 110 electronically connected to a cathode 120 by a first circuit 150, according to some embodiments of the present disclosure. As used herein, the term "electronically connected" refers to the ability to transport electrons between two elements; e.g. two electrodes. The electrochemical cell 100 may be charged using a charger 156 placed in the first circuit 150. Once charged the electrochemical cell's stored energy may be utilized, or discharged, by connecting a load 158 in the first circuit 150. The reversible transfer of electrons between the anode 110 and the cathode 120 is balanced by the reversible transfer of ions, either cations $M^+$ and/or anions $M^-$, through an electrolyte 130 that ionically connects the anode 110 and the cathode 120. As used herein, the term "ionically connected" refers to the ability to transport ions between two elements; e.g. two electrodes. As shown in FIG. 2, in some embodiments of the present disclosure a cell 100 may have a separator 180 positioned within the electrolyte 130 between the anode 110 and the cathode 120. In addition, the anode 110, the cathode 120, the electrolyte 130, and/or the separator 180 may all be contained within a container 190.

As used herein, an electrolyte refers to a medium that is capable of transporting ions by at least one of ion conduction, diffusion, and/or any other suitable transfer process. In some embodiments of the present disclosure, an electrolyte may include a salt dissolved in a liquid solvent. Liquid solvents may be aqueous or non-aqueous. Non-aqueous solvents include organic solvents such as at least one of ethylene carbonate, dimethyl carbonate, and/or diethyl carbonate. For lithium ion cells, the salt dissolved in the solvent may include at least one of $LiPF_6$, $LiBF_4$, and/or $LiClO_4$. As used herein, a circuit refers to a wire, tab, ribbon, and/or any other suitable mechanical structure and/or shape that is manufactured from a conductive metal, with examples include copper, gold, and/or silver.

In some embodiments of the present disclosure, an electrode (e.g. anode 110 and/or cathode 120) of the cell 100 may be an inert electrode and/or an active electrode. Examples of inert electrodes include at least one of gold, platinum, silver/silver-chloride, calomel, and/or glassy carbon. Inert electrodes do not participate and/or interfere in the redox reactions but instead serve only as a source of electrons. An active electrode is an electrode that is oxidized or reduced. For example, an electrode may be constructed of at least one of copper, nickel, zinc, and/or potassium ferrocyanid. In the case of copper, the copper may be oxidized at the anode 110 to $Cu^{2+}$ cations and where $Cu^{2+}$ cations are reduced at the cathode 120. In some embodiments of the present disclosure, the cell 100 may be an electrolytic cell, wherein an electrolytic cell is defined as an electrochemical cell in which a chemical reaction occurs; e.g. the purification of aluminum, synthesis of ammonia, etc. All electrochemical cells, including electrolytic cells use at least one active electrode. In some embodiments of the present disclosure, an electrode (e.g. anode 110 and/or cathode 120) of a cell 100 may be a conversion electrode, where a conversion electrode is a subset of an active electrode. The distinctive property of a conversion electrode is that the oxidation/reduction reactions occurring in a cell utilizing at least one conversion electrode is to store charge for retrieval at a later time. Examples of conversion anodes include at least one of iron oxide, calcium oxide, zinc oxide, and/or molybdenum oxide. Examples of conversion cathodes include at least one of sulfur, $CuF_2$, $FeCl_3$, and/or $FeF_2$. In some embodiments of the present disclosure, an electrode (e.g. anode 110 and/or cathode 120) of a cell 100 may be an intercalation electrode, where intercalation refers to the working ion, e.g. $Li^+$, $Mg^{2+}$, reversibly topotactically inserting/de-inserting into a host lattice of the electrode during the oxidation/reduction processes. Examples of intercalation anodes include at least one of graphite carbon, tin oxide, and/or lithium titanate. Examples of intercalation cathodes include at least one of $FePO_4$, cobalt, nickel, manganese oxides, and/or vanadates. In some embodiments of the present disclosure, an electrode (e.g. anode 110 and/or cathode 120) of a cell 100 may be a pure metal electrode or alloy electrode, undergoing a deposition/stripping or alloying process during the oxidation/reduction process. Examples of deposition anodes include Li and Mg and alloy anodes include $Li_xSn$.

Referring again to FIG. 2, the cell 100 stores and discharges energy using reversible reduction-oxidation reactions, with a first half reaction occurring reversibly at the anode and a second half reaction occurring reversibly at the cathode. For example, a rechargeable, intercalating Li-ion battery may have a reversible half reaction at the cathode defined by, $$FePO_4 + Li^+ + e^- \leftrightarrow LiFePO_4 \text{ with } E_{cat}^0 = 0.36 \text{ V vs. SHE} \quad (1)$$

and a reversible half reaction at the anode defined by, $$Li^+ + e^- + 6C \leftrightarrow LiC_6 \text{ with } E_{ano}^0 = -2.99 \text{ V vs. SHE} \quad (2)$$

where $E_{cat}^0$ is the standard reduction potential for the cathode and $E_{ano}^0$ is the standard reduction potential for the anode. SHE refers to the redox potential of a standard hydrogen electrode. The cell potential for this example of a rechargeable Li-ion battery is calculated by, $$E_{cell}^0 = E_{cat}^0 - E_{ano}^0 = 0.36 \text{ V} - -2.99 \text{ V} = 3.35 \text{ V} \quad (3)$$

The reverse reaction of Equation (1), oxidation at the cathode 120, occurs when charging the cell 100. The forward reaction of Equation (1), reduction at the cathode 120, occurs when discharging the cell 100. The forward reaction of Equation (2), reduction at the anode 110, occurs when charging the cell 100. The reverse reaction of Equation (2), oxidation at the anode 110, occurs when discharging the cell 100. Although Equations (1) through (3) illustrate a battery system utilizing the transfer of cations (e.g. $Li^+$), other embodiments of the present disclosure may utilize the transfer of anions. Table 3 summarizes some examples of the cations/anions, half reactions, and standard potentials that may be suitable for some embodiments of the present disclosure. As used herein a battery may include one or more cells, where a cell includes an anode and a cathode physically separated but ionically connected by an electrolyte as illustrated in FIG. 2.

TABLE 3

Half-Reactions and Standard Potentials

| Cathode Half Cell | | Anode Half Cell | | |
|---|---|---|---|---|
| Reaction(s) | $E_{cat}^0$ (V) | Reaction(s) | $E_{ano}^0$ (V) | $E_{cell}^0$ (V) |
| $FePO_4 + Li^+ + e^- \leftrightarrow LiFePO_4$ | 0.36 | $LiC_6 \leftrightarrow Li^+ + e^- + C$ | −2.99 | 3.35 |
| $Mn_2O_4 + Li^+ + e^- \leftrightarrow LiMn_2O_4$ | 0.76 | | | 3.75 |
| $CoO_2 + Li^+ + e^- \leftrightarrow LiCoO_2$ | 0.86 | | | 3.85 |
| $Ni_xCo_yAl_zO_2 + Li^+ + e^- \leftrightarrow LiNi_{1-x}Co_yAl_zO_2$ | 0.76 | | | 3.75 |
| $Ni_xMn_yCo_zO_2 + Li^+ + e^- \leftrightarrow LiNi_xMn_yCo_zO_2$ | 0.76 | | | 3.75 |
| | | $Li_2TiO_3 \leftrightarrow Li^+ + e^- + TiO_3$ | −1.64 | 2.4 |
| | | $Li_{4.4}Si \leftrightarrow Li^+ + e^- + Si$ | −2.64 | 3.4 |
| | | $Li_{4.4}Sn \leftrightarrow Li^+ + e^- + Sn$ | −2.44 | 3.2 |
| | | $Li \leftrightarrow Li^+ + e^-$ | −3.04 | 3.8 |
| $S_8 + 2Li^+ + e^- \leftrightarrow Li_2S_8$ $Li_2S_8 + 2Li^+ + e^- \leftrightarrow 2Li_2S_4$ $Li_2S_4 + 2Li^+ + e^- \leftrightarrow 2Li_2S_2$ $Li_2S + 2Li^+ + e^- \leftrightarrow 2Li_2S$ | −0.94 | $Li \leftrightarrow Li^+ + e^-$ | −3.04 | 2.1 |
| $Li_2O_2 \leftrightarrow O_2 + Li^+ + e^-$ | 0.06 | $Li \leftrightarrow Li^+ + e^-$ | −3.04 | 3.1 |
| $Na \leftrightarrows Na^+ + e^-$ | −2.71 | $S + 2e^- \leftrightarrow S^{2-}$ | −0.48 | 2.23 |
| $Na \leftrightarrows Na^+ + e^-$ | −2.71 | $NiCl_2 + 2Na^+ + 2e^- \leftrightarrow Ni + 2NaCl$ | −0.13 | 2.58 |
| $NaBr_3 + 2Na^+ + 2e^- \rightarrow 3NaBr$ | 1.1 | $2Na_2S_2 \rightarrow Na_2S_4 + 2Na^+ + 2e^-$ | −0.27 | 1.37 |
| $Na_3V_3Cr_2(PO_4)_2F_3 \leftrightarrow 3Na^+ + 3e^- + V_2(PO_4)_2F_3$ | 1.1 | $3NaC_6 \leftrightarrow 3Na^+ + 3e^- + C_6$ | −2.5 | 3.6 |
| $VO_2^+ + 2H^+ + e^- \leftrightarrow V^{2+} + H_2O$ | 1.0 | $V^{2+} \leftrightarrow V^{3+} + e^-$ | −0.26 | 1.26 |
| $4H^+ + O_2 + 4e^- \leftrightarrow 2H_2O$ | 1.23 | $V^{2+} \leftrightarrow V^{3+} + e^-$ | −0.26 | 1.49 |
| $Fe^{3+}[Fe^{3+}(CN)^-_6] + K^+ + e^- \leftrightarrow [K^+Fe^{3+}][Fe^{2+}(CN)^-_6]$ | 0.76 | $K \leftrightarrow K^+ + e^-$ | −2.93 | 3.69 |
| $Ce^{4+} + e^- \leftrightarrow Ce^{3+}$ | 1.61 | $Zn \leftrightarrow Zn^{2+} + 2e^-$ | −0.76 | 2.37 |
| $\frac{1}{2}O_2 + H_2O + 2e^- \leftrightarrow 2OH^-$ | 0.4 | $Zn + 4OH^- \leftrightarrow Zn(OH)_4^{2-} + 2e^-$ | −1.2 | 1.6 |
| $FeSiO_4 + Mg^{2+} + 2e^- \leftrightarrow MgFeSiO_4$ | 0.03 | $Mg \leftrightarrow Mg^{2+} + 2e^-$ | −2.37 | 2.4 |
| $2MnO_2 + Li^+ + e^- \leftrightarrow LiMn_2O_4$ | 1.01 | $Al + 7AlCl^-_4 \leftrightarrow 4Al_2Cl^-_7 + 3e^-$ | −1.69 | 2.7 |

Figure 3:
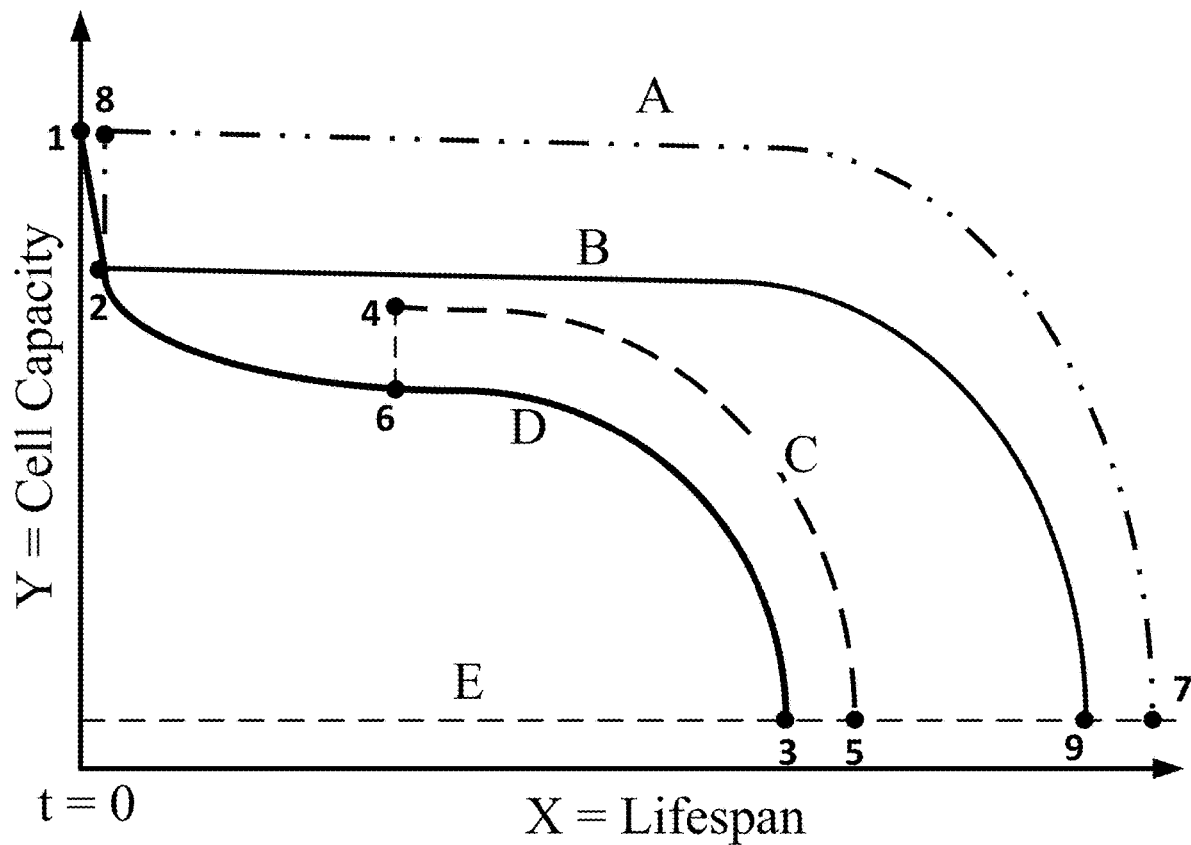
FIG. 3 illustrates hypothetical cell capacities plotted versus cell lifespan for rechargeable ion batteries, according to embodiments of the present disclosure.

FIG. 3 illustrates hypothetical cell capacities (Y-axis) plotted versus cell lifespan (X-axis, e.g. time). Curve (D) illustrates a typical degradation curve for a rechargeable ion cell; e.g. a Li-ion cell. After assembly in the manufacturing plant, at the beginning of the cell's life (e.g. t=zero on the X-axis), the cell may have a high starting cell capacity (on the Y-axis) as illustrated by point (1). However, this starting capacity typically drops significantly during formation cycles that are completed in the manufacturing plant to produce the final "as-shipped" cell product having a reduced cell capacity at point (2) on curve (D). Formation cycles are defined as the first electrochemical charge/discharge cycles of a cell/battery during which chemical (e.g. surface film formation) and/or mechanical (e.g. micro-fracturing) changes occur, after which cell capacity remains relatively stable. Then, during normal use in its final application (e.g. in an electric vehicle), the cell is subjected to normal discharging and recharging cycles, which may result in the slow degradation over time of the cell capacity, eventually ending at a final cell capacity, defined by straight line (E), corresponding to a lifespan requiring that the cell be replaced, as illustrated by point (3) on curve (D). As described above, this loss in cell capacity may be at least partially due to the loss of ions (e.g. cations and/or anions) over time. The remaining curves (A, B, and C) illustrate potential improvements to be gained in rechargeable ion cell, battery, and system capacities by implementing embodiments of the present disclosure.

For example, curve (A) illustrates an embodiment of the present disclosure where at least some of the ions lost due to degradation and aging may be continuously replenished from an ion reservoir that is electronically and ionically connected to at least one electrode of the cell. In some embodiments, replenishment of ions by an ion reservoir may begin in the manufacturing plant, thus potentially regaining some of the initial cell capacity lost that occurred in the plant due to formation cycling, thus shifting the cell capacity from point (2) on curve (D) to point (8) on curve (A). In addition to providing a higher starting cell capacity (e.g. "as-shipped" product from the manufacturing plant), continuous replenishment of ions has the potential to greatly extend the time before the cell reaches the final "end-of-life" capacity value (E) from point (3) on the typical performance curve (D) to point (7) on curve (A). Curve (B) illustrates that significant increases in cell lifespan may be achieved by continuous replenishment of ions from an ion reservoir, even if replenishment is not performed in the manufacturing plant, with the lifespan potentially increased from point (3) on curve (D) to point (9) on curve (B). Finally, curve (C) illustrates another embodiment of the present disclosure were ion replenishment does not begin until a predefined trigger is achieved during the cell's normal operation (e.g. a predefined intermediate cell capacity). At this point, the cell capacity may be significantly restored and shifted from point (6) on the typical performance curve (D) to a replenished cell capacity at point (4) on curve (C). Such a triggered release of ions from the ion reservoir may replenish enough ions to significantly increase the lifespan of the cell from point (3) on the typical degradation curve (D) to point (5) on the triggered release curve (C).

Figure 4A:
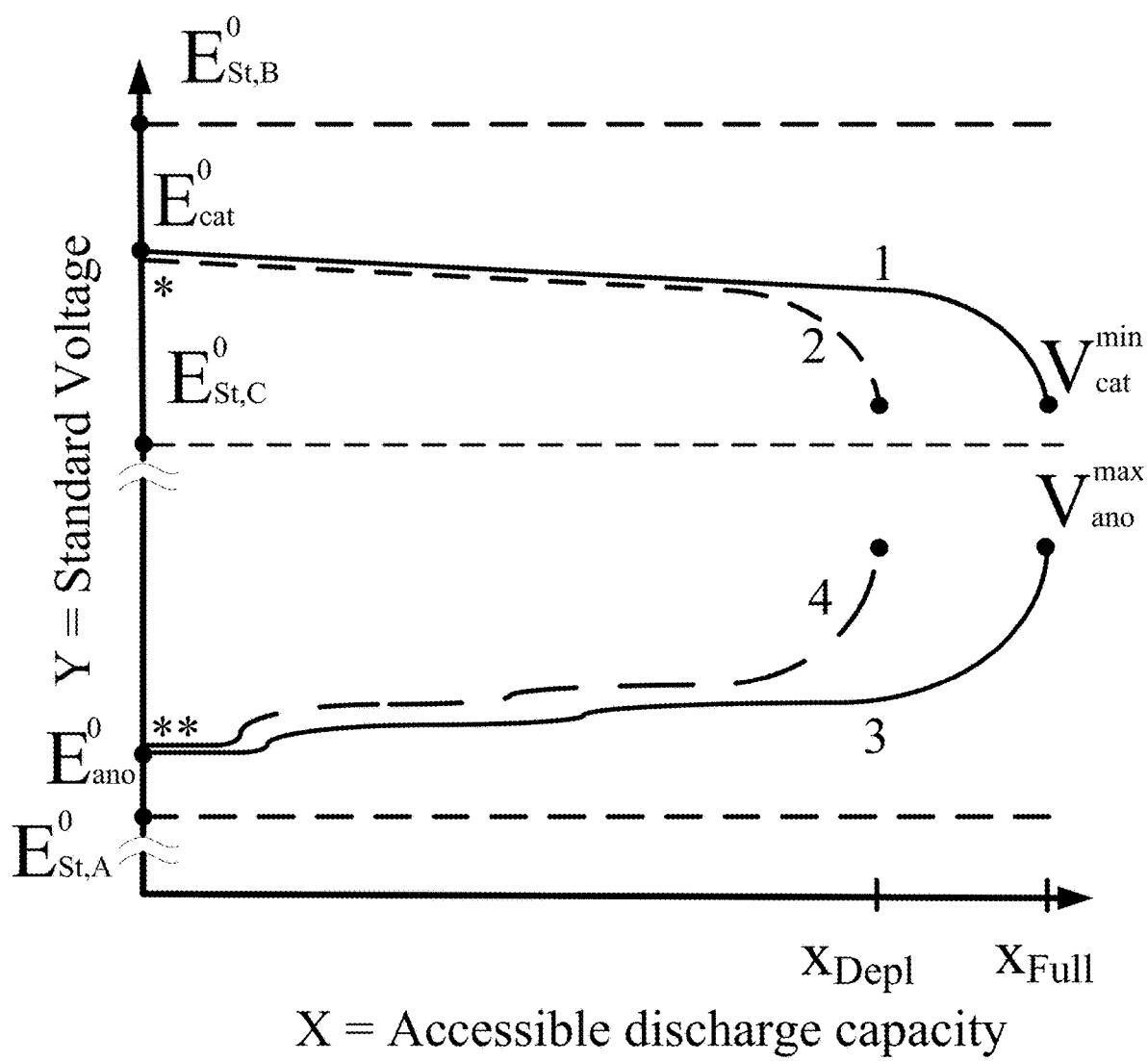
FIGS. 4A and 4B illustrate the standard voltage potentials as a function of accessible storage capacity for examples of a cathode, an anode, and an ion reservoir for the discharging and charging of a rechargeable ion cell respectively, according to embodiments of the present disclosure.
Figure 4B:
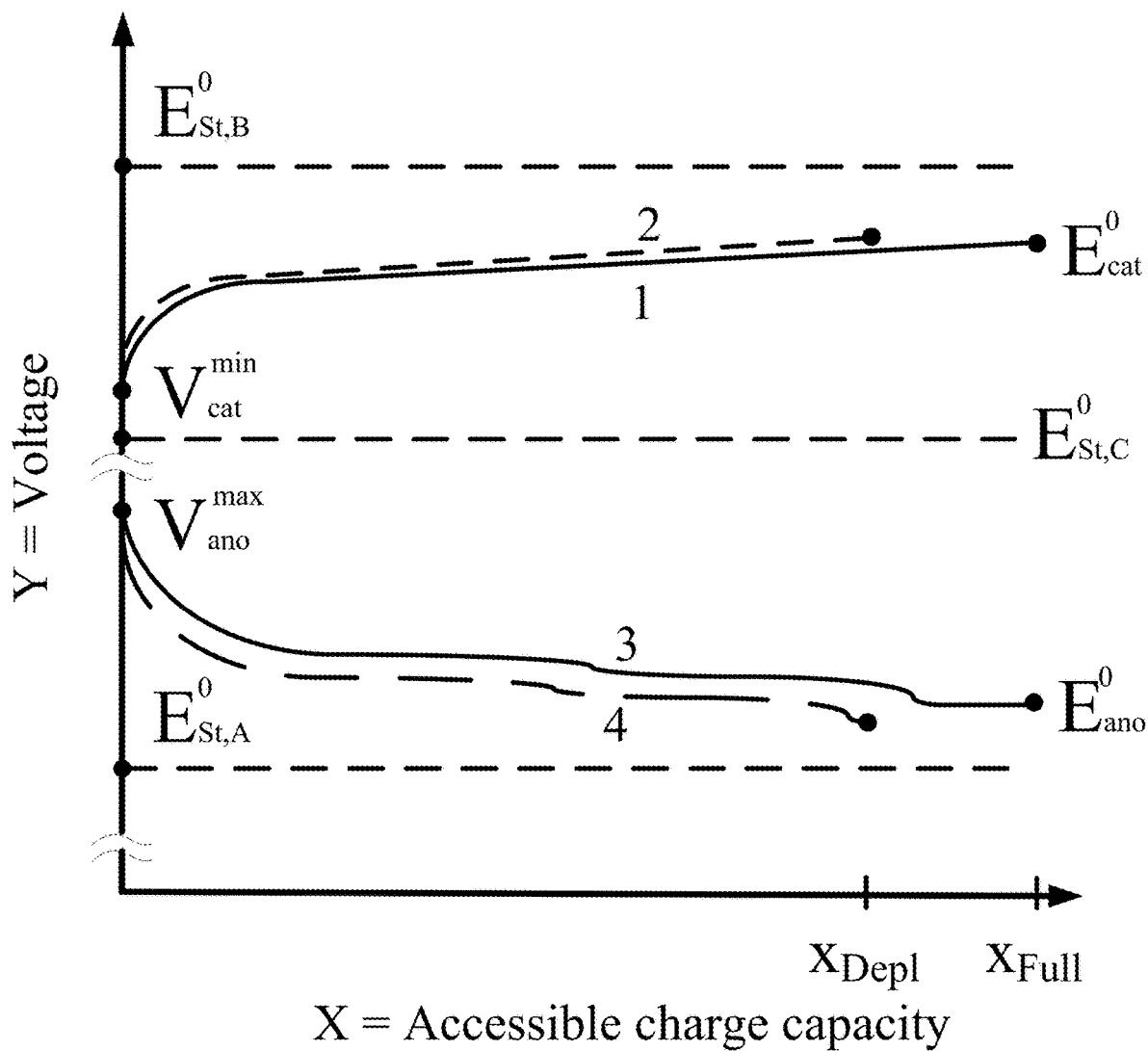

FIGS. 4A and 4B illustrate the standard voltage potentials as a function of accessible storage capacity for examples of a cathode, an anode, and an ion reservoir for the discharging and charging of a rechargeable ion cell respectively. Referring to FIG. 4A, an example of an ideal cathode's standard reduction voltage is plotted versus the cell's accessible charge capacity by curve (1). Curve (1) illustrates that, for an ideal case, when starting from a fully-charged state, the cathode will have a starting standard voltage potential of $E_{cat}^0$. Once the cell is connected to a load, the cathode's voltage potential will gradually decrease over time to $V_{cat}^{min}$, as the cathode's accessible charge capacity is consumed. Similarly, curve (3) illustrates the ideal case for the corresponding standard voltage potential of the ideal cell's anode, where the anode begins with its standard voltage potential of $E_{ano}^0$. Thus, during discharging, as current flows from the higher potential cathode to the lower potential anode, the voltage potential of the anode increases from its starting point of $E_{ano}^0$ to a final maximum voltage potential of $V_{ano}^{max}$. For the ideal case, the example cell represented in FIG. 4A will have an initial, fully charged cell standard voltage potential equal to $E_{cell}^0 = E_{cat}^0 - E_{ano}^0$, and a final discharged cell voltage potential equal to $V_{cell}^{end} = V_{cat}^{min} - V_{ano}^{max}$, and an accessible total charge capacity of $X_{full}$ (as indicated on the X-axis of FIGS. 4A and 4B). However, in most real-world situations, as explained above, rechargeable ion batteries typically experience ion loss over time due to degradation mechanisms, resulting in ion-depletion within at least one of the cathode and/or anode, which results in losses in the fully charged cell voltage potential, $E_{cell}^0$, losses in the accessible charge capacity, $X_{Depl}$, reduced charging/discharging cycle times, and/or reduced cell lifespan.

These losses are illustrated in FIGS. 4A and 4B by curves (2) and (4), which represent the non-ideal cases where ion losses occur in the non-ideal cell over time. Referring again to FIG. 4A, a non-ideal anion cell having a cathode experiencing anion losses may result in a shift of the ideal cathode voltage curve (1) to the left, resulting in curve (2). Similarly, a non-ideal cation cell having an anode experiencing cation losses may result in a shift of the ideal anode voltage curve (3) to the left, resulting in curve (4). Anion-depletion (e.g. anion loss) in the cathode may result in a starting, fully-charged, maximum voltage potential for the cathode (asterisk) for curve (2) that is less than the standard voltage potential for the ideal cathode, $E_{cat}^0$, on curve (1). Similarly, cation-depletion in the anode may result in a starting voltage potential for the anode (double asterisk) for curve (4) that is slightly greater than the standard voltage potential for the anode for an ideal cell, $E_{ano}^0$, on curve (3). Thus, the initial fully charged voltage for the non-ideal cell may be less than the initial fully charged standard cell voltage for the ideal cell. In addition, also due to ion losses, the voltage curves for the non-ideal cell (e.g. curves (2) and (4)) may have a lower accessible charge capacity; e.g. $X_{Depl}$ for a non-ideal cell as indicated on the X-axis of FIG. 4A. As result, lower accessible charge capacity for the non-ideal battery may result in a shorter cell charge-discharge cycle-time, and eventually a shorter over-all cell lifespan.

FIG. 4B illustrates the complementary charging portion of a battery cycle resulting from the discharge portion illustrated in FIG. 4A. In this example, the ideal charging curves (1) and (3) of FIG. 4B start from substantially the same ideal cathode and anode voltages as the discharging endpoints of the ideal electrodes illustrated in the discharging curves (1) and (3) of FIG. 4A, e.g. $V_{cat}^{min}$ and $V_{ano}^{max}$ respectively. Thus, charging the ideal cell may start with substantially the same discharged cell voltage potential, equal to $V_{cell}^{end} = V_{cat}^{min} - V_{ano}^{max}$. Once the cell is connected to a charging voltage source, the cathode's voltage potential may gradually increase over time to the cathode's standard reduction potential, $E_{cat}^0$, and the cell's accessible charge capacity is restored to $x_{Full}$. Similarly, curve (3) of FIG. 4B illustrates the ideal case for the corresponding voltage potential of an ideal cell's anode during charging. As the cell is charged, the voltage potential of the anode may decrease from its starting point, $V_{anode}^{max}$, to the fully charged end state corresponding to the anode's standard voltage potential, $E_{ano}^0$, thus restoring the ideal cell to the maximum fully charged cell voltage potential of $E_{cell}^0=E_{cat}^0-E_{ano}^0$. However, as in the charging case of FIG. 4A, in most real-world situations, rechargeable ion cells typically experience ion loss over time due to degradation mechanisms, resulting in ion-depletion within at least one of the cathode and/or anode, resulting in cell performance that is less than desirable.

Such losses are illustrated in FIGS. 4A and 4B by curves (2) and (4) for the cathode and anode respectively, which represent the non-ideal cases where ion losses occurs in the non-ideal cell over time. Referring again to FIG. 4B, a non-ideal cation cell having a cathode experiencing cation losses may result in a shift of the ideal cathode voltage curve (1) to the left to curve (2). Similarly, a non-ideal anion cell having an anode experiencing anion losses may result in a shift of the ideal anode voltage curve (3) to the left to curve (4). Cation-depletion (e.g. cation loss) in the cathode may result in the charging non-ideal cell having a lower accessible charge capacity, $X_{Depl}$, for the same fully-charged cathode standard reduction voltage, $E_{cat}^0$. Similarly, anion-depletion in the anode may result in the charging of a non-ideal cell having a lower accessible charge capacity, $x_{Depl}$, for the same fully-charged anode standard reduction voltage potential, $E_{ano}^0$. Thus, the final fully charged cell voltage potential for the non-ideal cell may be less than or equal to the final fully charged voltage potential for the ideal cell, $E_{cell}^0$. However, ion losses in the non-ideal cell may result in a lower accessible charge capacity, $X_{Depl}$, relative to $X_{full}$ for the ideal cell. In addition, lower accessible charge capacity of the non-ideal battery may result in a shorter cell charge-discharge cycle-time, and eventually a shorter overall cell lifespan.

Some embodiments of the present disclosure may enable the restoration and/or maintenance of the voltage characteristics of non-ideal cells experiencing ion losses, represented by curves (2) and (4) in FIGS. 4A and 4B, so that their voltage characteristics approximate those of ideal cells as represented by curves (1) and (3) in FIGS. 4A and 4B. For example, according to some embodiments of the present disclosure, a cell may be constructed to have an ion reservoir that is ionically and electronically connected to the cell's cathode and/or anode. In some embodiments, a first ion reservoir may be connected to a first electrode and a second ion reservoir may be connected to a second electrode. Referring again to FIGS. 4A and 4B, for the case where the ion being depleted and replenished is a cation (e.g. Li$^+$), providing a cation reservoir having a standard voltage potential, $E_{st}^0$, less than the standard voltage potential of the electrode it is connected to may enable the passive transfer of cations from the cation reservoir to the cation-depleted electrode, thereby replenishing the ions in the electrode and restoring/maintaining the cell's charge/discharge capacity to values that are closer to the charge/discharge capacity of an ideal cell. Thus, a cation-depleted cathode may be passively replenished with "fresh" cations from a cation reservoir provided $E_{st}^0<E_{cat}^0$; this condition is met, for example, through the use of reservoir(s) with standard potential(s) $E_{St}^0=E_{St,A}^0$ and/or $E_{St}^0=E_{St,C}^0$. Similarly, a cation-depleted anode may be passively replenished with "fresh" cations from a cation reservoir provided $E_{st}^0<E_{ano}^0$; this condition is met, for example, through the use of a reservoir with standard potential $E_{st}^0=E_{St,A}^0$.

Referring again to FIGS. 4A and 4B, for the case where the ion being depleted and replenished is an anion (e.g. Br$^-$), providing an anion reservoir having a standard voltage potential, $E_{st}^0$, greater than the voltage potential of the electrode it is connected to may enable the passive transfer of anions from the anion reservoir to the anion-depleted electrode, thereby replenishing the anions in the electrode and restoring/maintaining the cell's charge/discharge capacity to values that are closer to the charge/discharge capacity of an ideal cell. Thus, an anion-depleted cathode may be passively replenished with "fresh" anions from an anion reservoir provided $E_{st}^0>E_{cat}^0$; this condition is met, for example, through use of a reservoir with standard potential $E_{St}^0=E_{St,B}^0$. Similarly, an anion-depleted anode may be passively replenished with "fresh" anions from an anion reservoir provided $E_{st}^0>E_{ano}^0$; this condition is met for example, through the use of reservoir(s) with standard potential(s) $E_{St}^0=E_{St,B}^0$ and/or $E_{St}^0=E_{St,C}^0$.

Figure 5A:
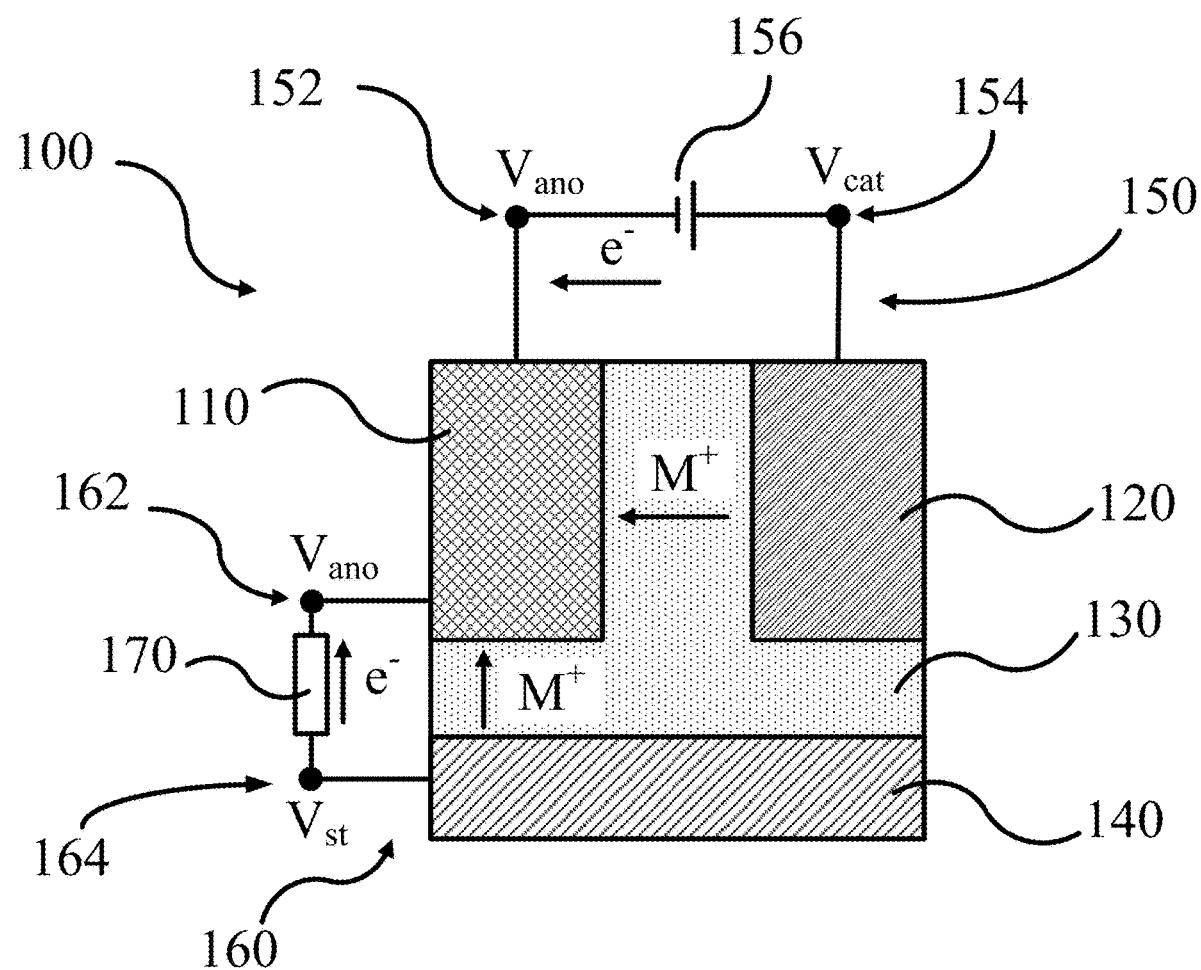
FIGS. 5A-D illustrate a rechargeable ion battery utilizing cations and having a cation reservoir, according to embodiments of the present disclosure.
Figure 5B:
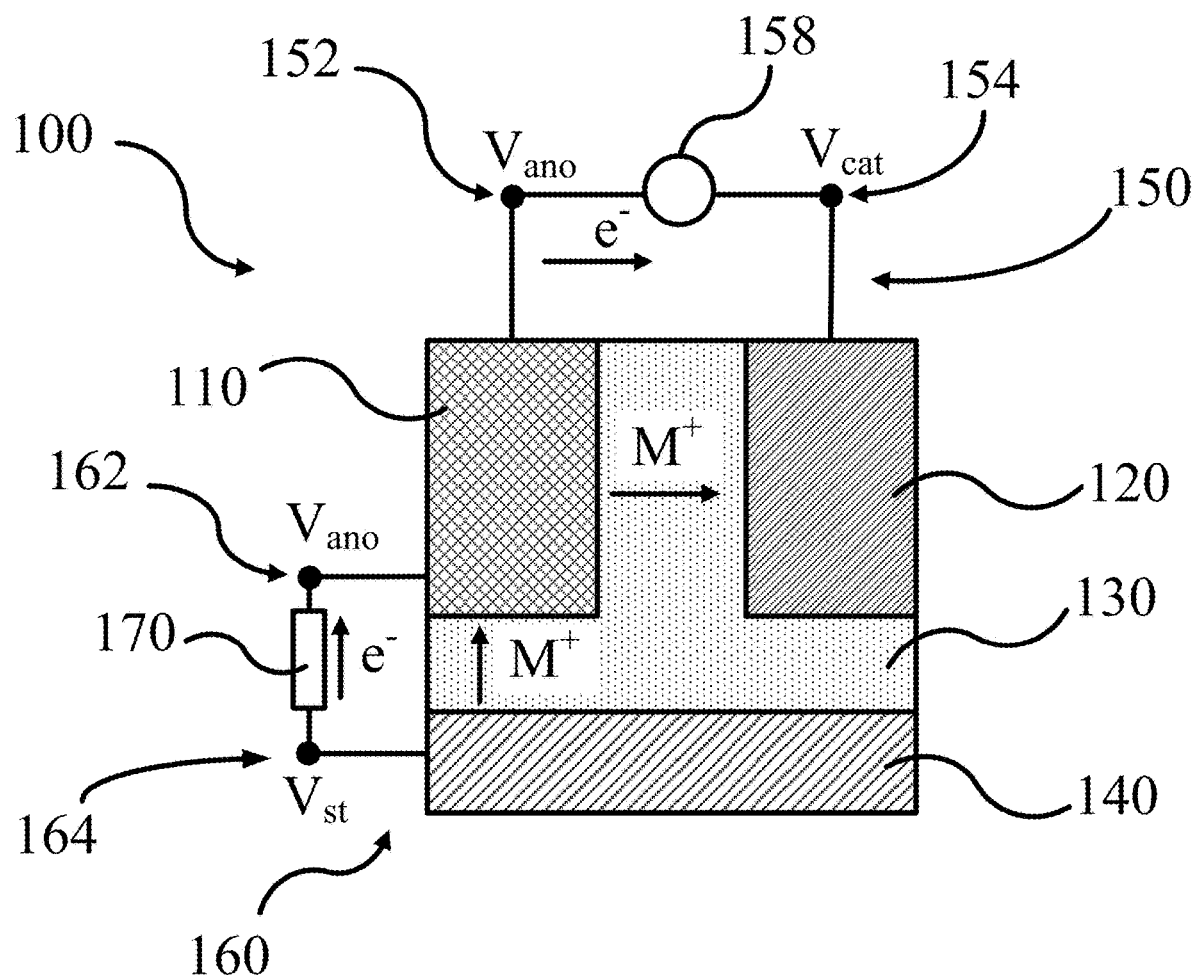

FIGS. 5A and 5B illustrate some embodiments of the present disclosure, for charging and discharging respectively, a rechargeable cell 100 where a cation, M$^+$ (e.g. Li$^+$), is reversibly transferred between a cathode 120 and an anode 110. FIG. 5A illustrates the flow of charged elements during the charging process of the cell 100, for an ion-battery and/or ion-cell using one or more cations (e.g. Li$^+$). The cell 100 includes an anode 110 and a cathode 120 electronically connected by a first circuit 150. Charging the cell 100 may be accomplished by placing a charger 156 in the first circuit 150 between a first terminal 152 and a second terminal 154. Charging the cell 100 may cause the following generic oxidation reaction to occur at the cathode:

$$MX \rightarrow X + M^+ + e^- \qquad (4)$$

where M$^+$ is the cation and e$^-$ is an electron. Examples of cations according to some embodiments of the present disclosure include Li$^+$, Na$^+$, K$^+$, Mg$^{2+}$, V$^{2+}$, and/or Ce$^{3+}$. X represents a cathode material into which the cation, M$^+$, may reversibly intercalate/deintercalate, or with which the cation may undergo a reversible conversion, deposition/stripping, and/or alloying reaction. Examples of cathode materials include FePO$_4$, Mn$_2$O$_4$, CoO$_2$, Ni$_x$Co$_y$Al$_z$O$_2$, sulfur, CuF$_2$, FeCl$_3$ and/or Ni$_x$Mn$_y$Co$_z$O$_2$. In some embodiments of the present disclosure, the cathode may include a material X that is an active material and/or an inert material that reversibly produces and consumes the cation and electron. These materials may be in the form of core-shell materials, with the core constructed of cathode materials, covered by an external shell of a different material, such as Ni$_x$Al$_y$O$_2$.

Charging the cell 100 may cause the following generic reduction reaction to simultaneously occur at the anode:

$$Y + M^+ + e^- \rightarrow YM \qquad (5)$$

where Y represents an anode material into which the cation, M$^+$, may reversibly intercalate/deintercalate, or with which the anion may undergo a conversion, deposition/stripping, and/or alloying reaction. Examples of anode materials include carbon, TiO$_3$, lithium, silicon, and/or composites or alloys of silicon and tin, in addition to geometric variants of the above materials such as core-shell type materials, wherein the core of the material particles may include one type of material (e.g., Si) and the shell may be constructed of one or more of the other materials (e.g. carbon or titanium oxide). In some embodiments of the present disclosure, the anode may include a material Y that is an active material and/or an inert material that reversibly produces and consumes the cation and electron. Thus, charging the cell 100 may result in the formation of electrons at the cathode 120, which are transferred through the first circuit 150 to the anode 110. The negative charge provided to the anode 110 by the electrons may be balanced by the simultaneous transfer of cations, M⁺, from the cathode 120 to the anode 110, through an electrolyte 130 that ionically connects the anode 110 and the cathode 120.

Assuming that the cell 100 starts from a completely discharged state, charging the cell 100, e.g. using the charger 156, may result in a charging process similar to that shown previously in FIG. 4B. Thus, the voltage potential of the cathode 120, for an ideal cell, may rise from $V_{cat}^{min}$ to the cathode's standard reduction potential, $E_{cat}^0$, and the voltage potential of the anode 110, for an ideal cell, may decrease from $V_{anode}^{max}$ to the standard reduction potential of the anode, $E_{ano}^0$, resulting in the fully charged cell voltage potential equal to $E_{cell}^0 = E_{cat}^0 - E_{ano}^0$, having a fully charged charge capacity of $X_{full}$.

FIG. 5B illustrates the flow of charged elements during the discharging process of the cell 100, using one or more cations (e.g. Li⁺). The cell 100 includes the anode 110 and the cathode 120 electronically connected by a first circuit 150, as discussed above for FIG. 5A. Discharging the cell 100 may be accomplished by placing a load 158 in the first circuit 150 between the first terminal 152 and the second terminal 154. Discharging the cell 100 may cause the following generic reduction reaction to occur at the cathode:

$$X + M^+ + e^- \rightarrow MX \tag{6}$$

where M⁺ is the cation and e⁻ is an electron. Discharging the cell 100 may cause the following generic oxidation reaction to simultaneously occur at the anode:

$$YM \rightarrow Y + M^+ e^-. \tag{7}$$

Thus, discharging the cell 100 may result in the formation of electrons at the anode 110, which are transferred through the first circuit 150 to the cathode 120. The negative charge provided to the cathode 120 by the electrons may be balanced by the simultaneous transfer of cations, M⁺, from the anode 110 to the cathode 120, through the electrolyte 130 that ionically connects the anode 110 and the cathode 120.

Assuming that the cell 100 starts from a completely charged state, discharging the cell 100, e.g. using the load 158, may result in a charging process similar to that shown previously in FIG. 4A. Thus, the voltage potential of the cathode 120, for an ideal cell, may diminish from the cathode's standard reduction potential, $E_{at}$ to the cathode's minimum voltage potential, $V_{cat}^{min}$, and the voltage potential of the anode 110, for an ideal cell, may change from the anode's standard reduction potential, $E_{ano}^0$, to the anode's maximum voltage potential, $V_{ano}^{max}$, resulting in the fully discharged cell voltage potential equal to $V_{cell}^{min} = V_{cat}^{min} - V_{ano}^{max}$, after consuming the complete charge capacity of $X_{full}$.

However, as stated above, in "real world" applications, rechargeable ion-cells (and batteries) experience ion depletion, which results in non-ideal cell performances losses to the terminal voltage, charge capacity, charge/discharge cycle time, and/or lifespan. According to some embodiments of the present disclosure, an ion reservoir 140 may reduce and/or eliminate these performance losses. For example, FIGS. 5A and 5B illustrate a rechargeable cation cell 100 having an ion reservoir 140 containing cations electronically connected to the anode 110 by a second circuit 160 having an electronic regulating element 170 positioned in the second circuit 160 between a third terminal 162 and a fourth terminal 164. FIGS. 5A and 5B illustrate that the electronic regulating element 170 may regulate the flow of electrons from the ion reservoir 140 to the anode 110 and/or the electronic regulating element 170 may regulate the flow of current from the anode 110 to the reservoir 140. To balance the flow of electrons from the ion reservoir 140 to the anode 110, the ion reservoir 140 may simultaneously release cations, M⁺, which may then flow through the electrolyte 130 to the anode 110, thus replacing at least a portion of any cations, M⁺, lost and/or rendered unusable in the anode 110 due to the degradation mechanisms described above, or for other reasons. Thus, as long as the ion reservoir 140 has a standard reduction potential that is less than the standard reduction potential of the anode ($E^0_{St,A} < E^0_{ano}$ in FIGS. 4A and 4B), the ion reservoir 140 may passively release cations, which may then be transferred through the electrolyte 130 to the anode 110 to replenish the cation-depleted anode 110 with "fresh" cations, thus restoring the cell's performance to something closer to the performance of an ideal cell.

For a cell 100 configured for a Li-ion system, the ion reservoir 140 may include lithium metal, such that the lithium metal is oxidized to produce the electrons and cations shown in FIGS. 5A and 5B by the reaction

$$Li \rightarrow Li^+ + e^- \text{ with } E_{Si} = -3.04 \text{ V}. \tag{8}$$

In some embodiments of the present disclosure, a cation reservoir may include at least one of lithium, magnesium, aluminum, sodium, potassium, zinc, and/or vanadium, and/or any suitable alloy thereof, wherein each element provides cations when the cell 100 is depleted; e.g. Li⁺, Mg²⁺, Al³⁺, Na⁺, K⁺, Zn²⁺, and V²⁺,³⁺,⁴⁺, or 5⁺, respectively. In some embodiments of the present disclosure, a cation reservoir may include at least one of an intercalation electrode; e.g. LiFePO₄, LiMn₂O₄, LiCoO₂, LiNi$_x$Co$_y$Al$_z$O₂, LiNi$_x$Mn$_y$Co$_z$O₂, LiC₆, and Li₂TiO₃. In some embodiments of the present disclosure, a cation reservoir may include at least one of a conversion electrode; e.g. Li$_x$S$_y$, and Li$_x$Si$_y$. In some embodiments of the present disclosure, an anion reservoir may include at least one of an intercalation, conversion, deposition/stripping, or alloying electrode. Examples include chemical compounds or solutions containing bromine, chlorine, fluorine, and hydroxide.

Figure 5C:
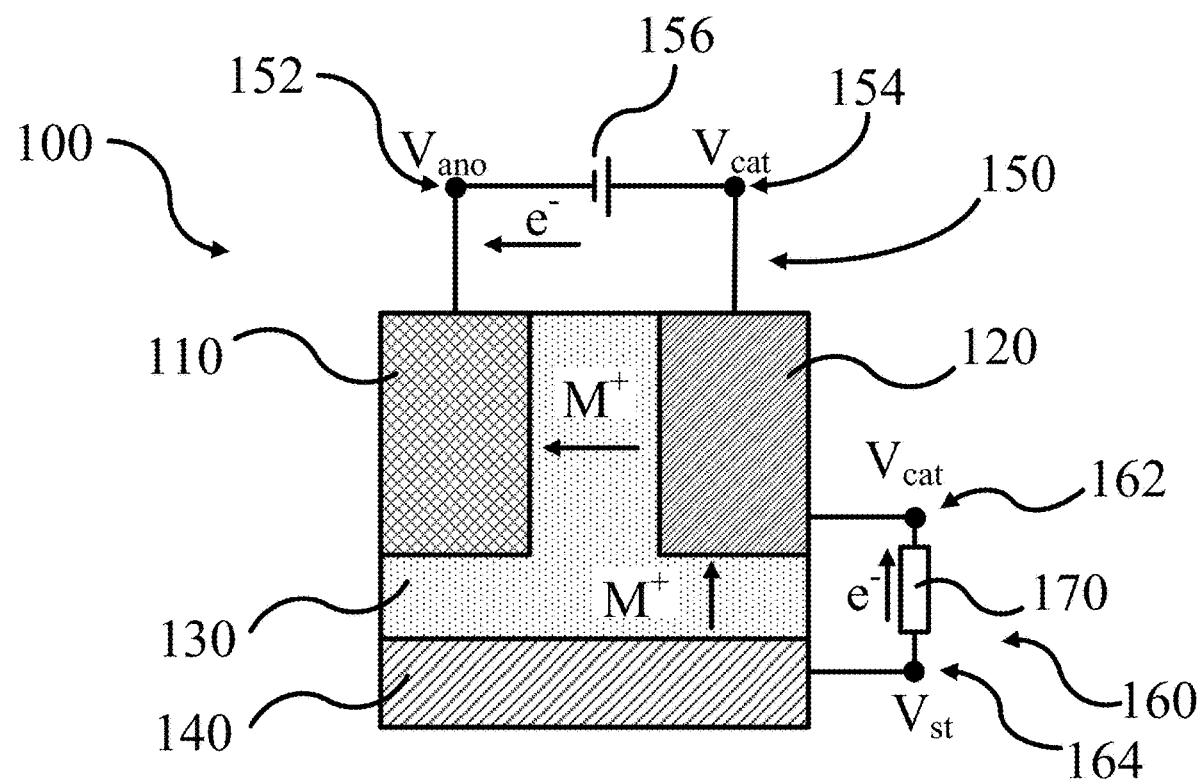
Figure 5D:
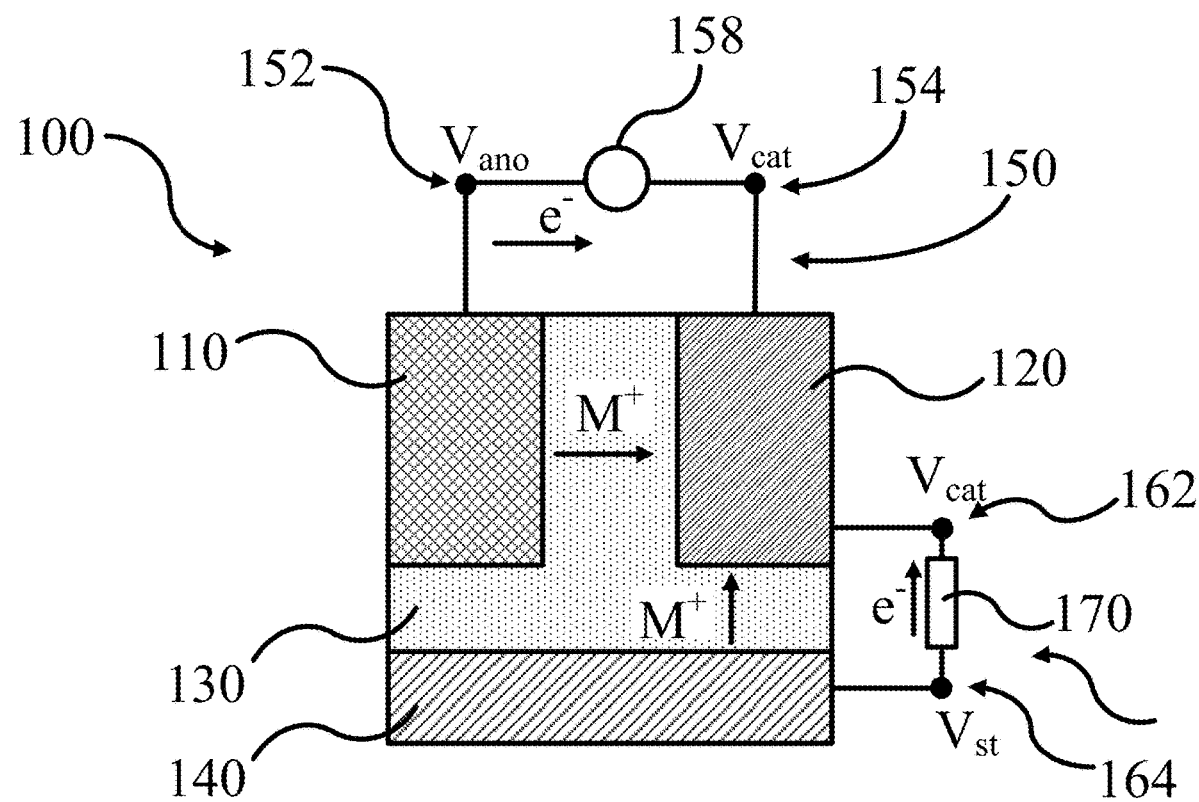

In some embodiments, a rechargeable cation cell 100 may have an ion reservoir 140 containing cations electronically connected to the cathode 120 by a second circuit 160 having an electronic regulating element 170 positioned in the second circuit 160 between a third terminal 162 and a fourth terminal 164. For example, FIGS. 5C and 5D illustrate that the electronic regulating element 170 may regulate the flow of electrons from the ion reservoir 140 to the cathode 120 and/or the electronic regulating element 170 may regulate the flow of current from the cathode 120 to the reservoir 140. To balance the flow of electrons from the ion reservoir 140 to the cathode 120, the ion reservoir 140 may simultaneously release cations, M⁺, which may then flow through the electrolyte 130 to the cathode 120, thus replacing at least a portion of any cations, M⁺, lost and/or rendered unusable in the cathode 120 due to degradation mechanisms as described above. Thus, as long as the ion reservoir 140 has a standard reduction potential that is less than the standard reduction potential of the cathode (e.g. $E^0_{St,A} < E^0_{cat}$ and/or $E^0_{St,C} < E^0_{cat}$ in FIGS. 4A and 4b), the ion reservoir 140 may release cations, which may then be transferred through the electrolyte 130 to the cathode 120 to replenish the cation-depleted cathode 120 with "fresh" cations, thus restoring the cell's performance to something closer to the performance of an ideal cell.

Figure 6A:
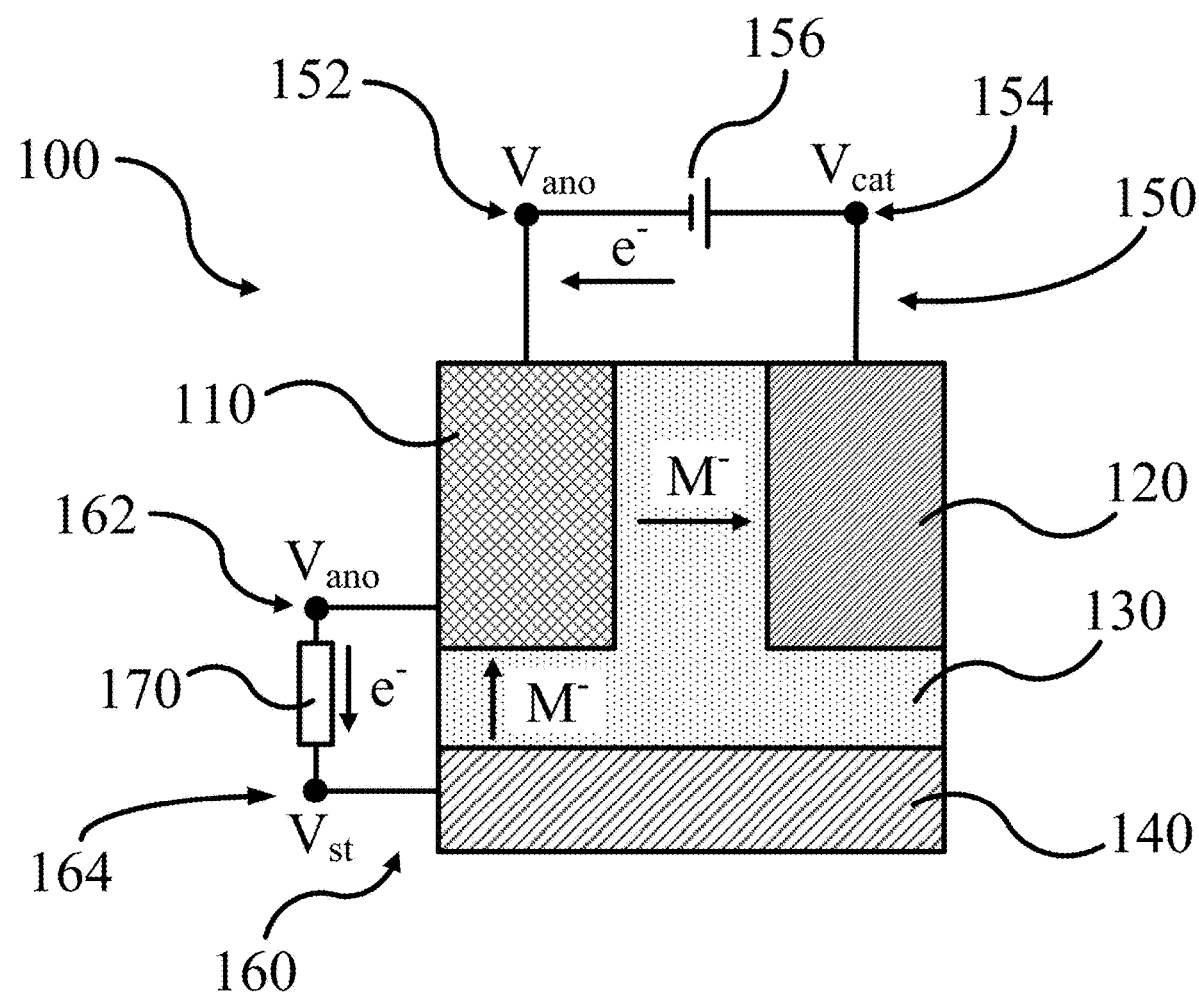
FIGS. 6A-D illustrate a rechargeable ion battery utilizing anions and having an anion reservoir, according to embodiments of the present disclosure.
Figure 6B:
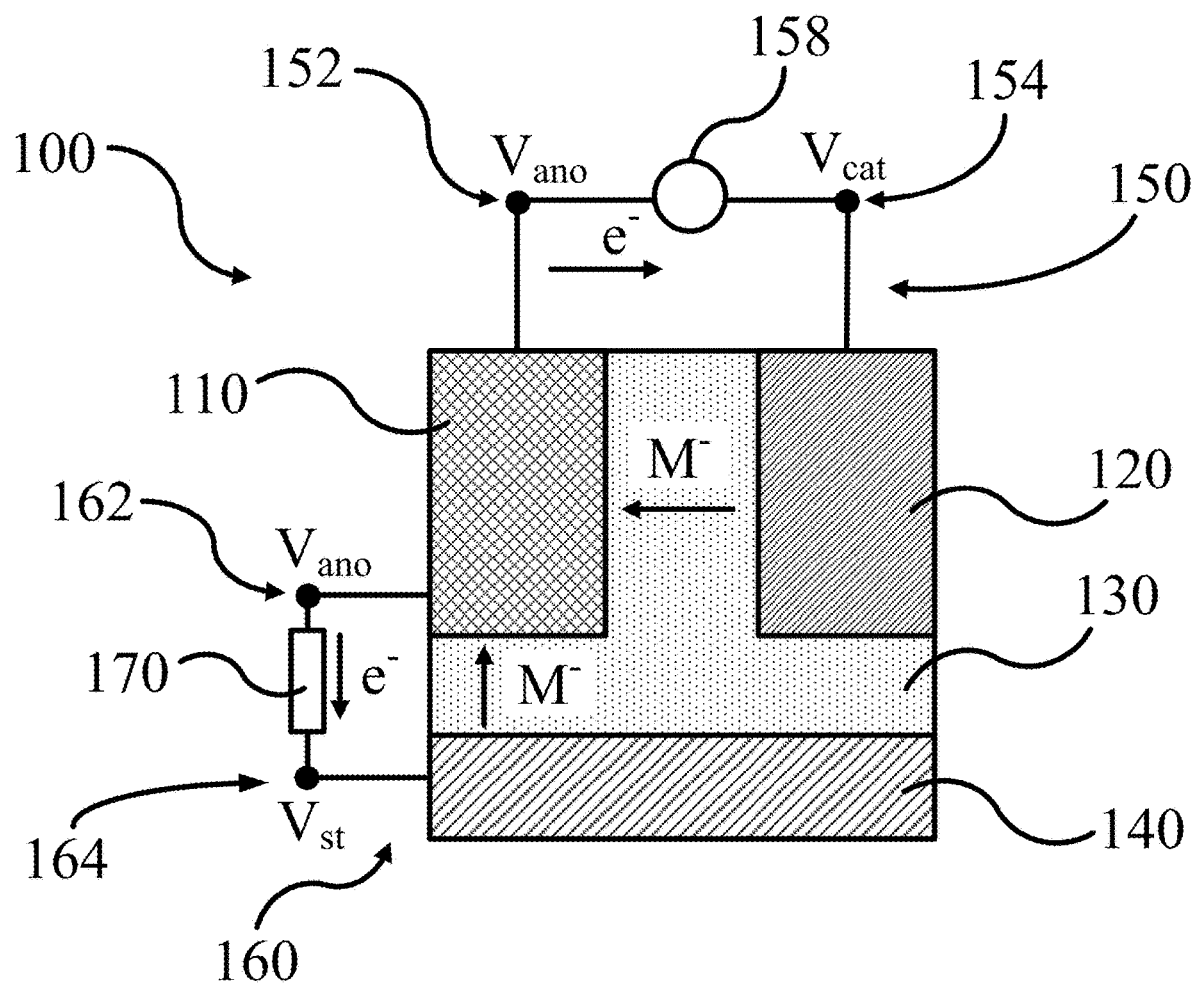

FIGS. 6A and 6B illustrate some embodiments of the present disclosure, for charging and discharging respectively, a rechargeable anion cell 100 where an anion, M⁻ (e.g. Br⁻), is reversibly transferred between a cathode 120 and an anode 110. FIG. 6A illustrates the flow of charged elements during the charging process of the cell 100, using one or more anions (e.g. Br⁻). The cell 100 includes an anode 110 and a cathode 120 electronically connected by a first circuit 150. Charging the cell 100 may be accomplished by placing a charger 156 in the first circuit 150 between a first terminal 152 and a second terminal 154. Charging the cell 100 (FIG. 6A) may cause the following generic oxidation reaction to occur at the cathode:

$$W + M^- \rightarrow WM + e^- \qquad (9)$$

where M⁻ is the anion and e⁻ is an electron. Examples of anions according to some embodiments of the present disclosure include Br⁻, Cl⁻, F⁻, and OH⁻. W represents a cathode material into which the anion, M⁻, may reversibly intercalate/deintercalate or with which the anion may undergo a conversion reaction. Examples of cathode materials are NaBr and ClBr. In some embodiments of the present disclosure, the cathode may include an active electrode material to reversibly produce and consume an anion, M⁻.

Charging the cell 100, as shown in FIG. 6A, may cause the following generic reduction reaction to simultaneously occur at the anode:

$$ZM + e^- \rightarrow Z + M^- \qquad (10)$$

where Z represents an anode material into which the anion, M⁻, may reversibly intercalate/deintercalate or with which the anion may undergo a conversion reaction. In some embodiments of the present disclosure, the anode may include an active electrode material to reversibly produce and consume the anion, M⁻. Thus, charging the cell 100 may result in the formation of electrons at the cathode 120, which are transferred through the first circuit 150 to the anode 110. The negative charge provided to the anode 110 by the electrons may be balanced by the simultaneous generation of anions, M⁻, at the anode 110, which are then transferred from the anode 110 to the cathode 120, through the electrolyte 130 that ionically connects the anode 110 and the cathode 120.

Assuming that the cell 100 starts from a completely discharged state, charging the cell 100 (e.g. using the charger 156), may result in a charging process similar to that shown previously in FIG. 4B. Thus, the voltage potential of the cathode 120, for an ideal cell, may rise from $V_{cat}^{min}$ to the cathode's standard reduction potential, $E_{cat}^0$, and the voltage potential of the anode 110, for an ideal cell, may decrease from $V_{anode}^{max}$ to the standard reduction potential of the anode, $E_{ano}^0$, resulting in a fully charged cell voltage potential equal to $E_{cell}^0 = E_{cat}^0 - E_{ano}^0$, having a fully charged charge capacity of $X_{full}$.

FIG. 6B illustrates the flow of charged elements during the discharging process of the cell 100, using one or more anions (e.g. Br⁻). The cell 100 includes the anode 110 and the cathode 120 electronically connected by the first circuit 150, as discussed above for FIG. 5A. Discharging the cell 100 may be accomplished by placing a load 158 in the first circuit 150 between the first terminal 152 and the second terminal 154. Discharging the cell 100 may cause the following generic reduction reaction to occur at the cathode:

$$WM + e^- \rightarrow W + M^- \qquad (11)$$

where M⁻ is the anion and e⁻ is an electron. Discharging the cell 100 may cause the following generic oxidation reaction to simultaneously occur at the anode:

$$Z + M^- \rightarrow ZM + e^-. \qquad (12)$$

Thus, discharging the cell 100 may result in the formation of electrons at the anode 110, which are transferred through the first circuit 150 to the cathode 120. The negative charge provided to the cathode 120 by the electrons may be balanced by the simultaneous generation of anions, M⁻, at the cathode 120, which are then transferred from the cathode 120 to the anode 110, through the electrolyte 130 that ionically connects the anode 110 and the cathode 120. As for some of the cation embodiments described above, the cathode and/or the anode may be an active electrode and/or an inert electrode for some of the anion embodiments of the present disclosure.

Assuming that the cell 100 starts from a completely charged state, discharging the cell 100, e.g. using the load 158, may result in a charging process similar to that shown previously in FIG. 4A. Thus, the voltage potential of the cathode 120, for an ideal cell, may diminish from the cathode's standard reduction potential, $E_{cat}^0$ to the cathode's minimum voltage potential, $V_{cat}^{min}$, and the voltage potential of the anode 110, for an ideal cell, may change from the anode's standard reduction potential, $E_{ano}^0$, to the anode's maximum voltage potential, $V_{ano}^{max}$, resulting in the fully discharged cell voltage potential equal to $V_{cell}^{min} = V_{cat}^{min} - V_{ano}^{max}$, after consuming the complete charge capacity of $X_{full}$.

However, as stated above, in "real world" applications, a rechargeable ion-cell experiences ion depletion, which results in non-ideal cell performance such as losses to the terminal voltage, charge capacity, charge/discharge cycle time, and/or lifespan. According to some embodiments of the present disclosure, an ion reservoir 140 may reduce and/or eliminate these performance losses. For example, FIGS. 6A and 6B illustrate a rechargeable anion cell 100 having an ion reservoir 140 containing anions electronically connected to the anode 110 by a second circuit 160 having an electronic regulating element 170 positioned in the second circuit 160 between a third terminal 162 and a fourth terminal 164. FIGS. 6A and 6B illustrate that the electronic regulating element 170 may regulate the flow of electrons from the anode 110 to the ion reservoir 140 and/or the electronic regulating element 170 may regulate the flow of current from the ion reservoir 140 to the anode 110. To balance the flow of electrons from the anode 110 to the ion reservoir 140, the ion reservoir 140 may simultaneously release anions, M⁻, which may then flow through the electrolyte 130 to the anode 110, thus replacing at least a portion of any anions, M⁻, lost and/or rendered unusable in the anode 110. Thus, as long as the ion reservoir 140 has a standard reduction potential that is greater than the standard reduction potential of the anode 110 (e.g. $E^0_{St,C} > E^0_{ano}$ or $E^0_{St,B} > E^0_{ano}$ in FIGS. 4A and 4B), the ion reservoir 140 may passively release anions, which may then be transferred through the electrolyte 130 to the anode 110 to replenish the anion-depleted anode 110 with "fresh" anions and restoring the cell's performance to something closer to the performance of an ideal cell.

For a cell 100 configured for a Br⁻ ion system, the ion reservoir 140 may include Br₂, such that the bromine may be reduced to produce the anions and consume the electrons transferred from the anode 110 to the ion reservoir 140, as shown in FIGS. 6A and 6B, by the reaction $$Br_2 + 2e^- \rightarrow 2Br^-. \qquad (8)$$

Figure 6C:
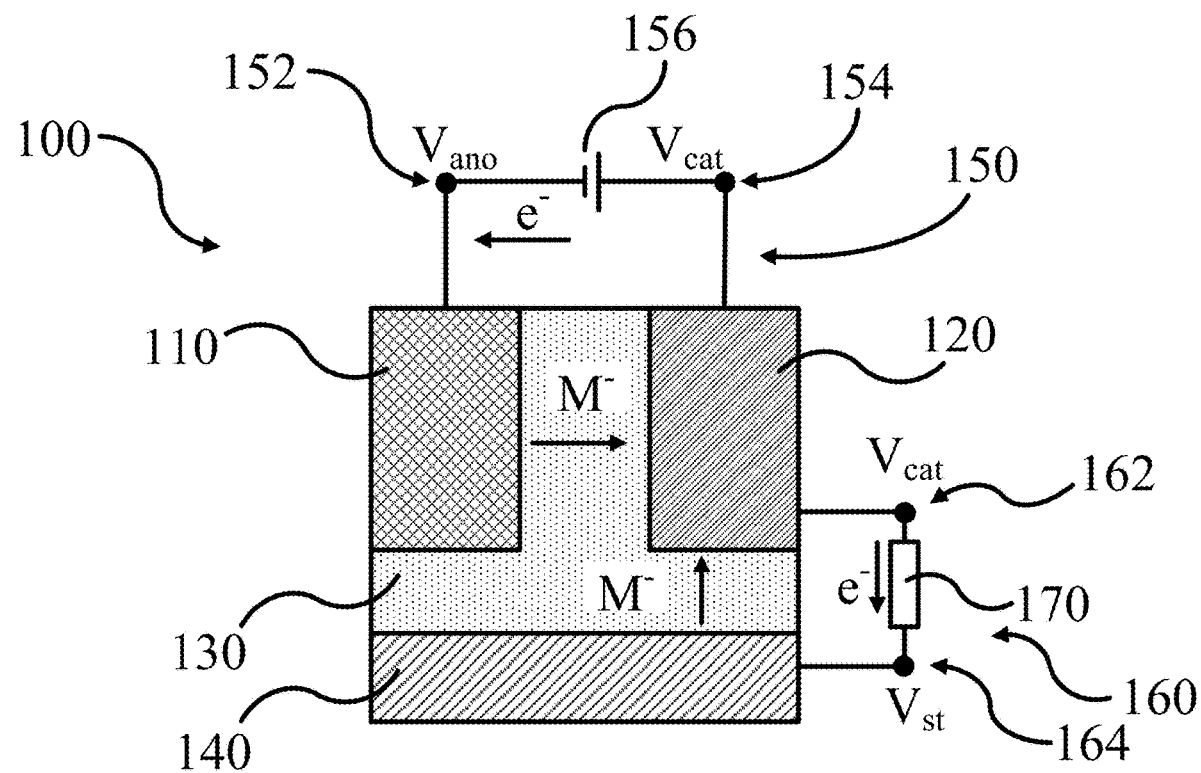
Figure 6D:
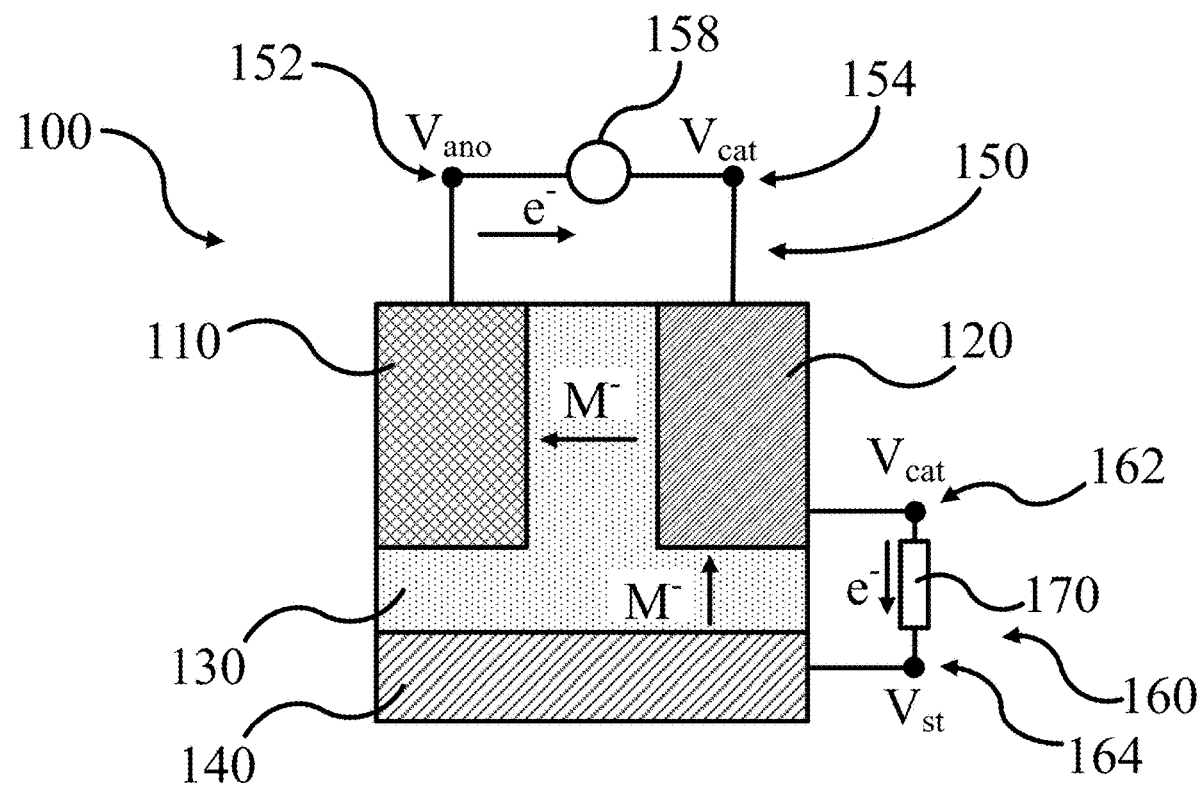

In some embodiments, a rechargeable anion cell 100 may have an ion reservoir 140 containing anions electronically connected to the cathode 120 by a second circuit 160 having an electronic regulating element 170 positioned in the second circuit 160 between a third terminal 162 and a fourth terminal 164. For example, FIGS. 6C and 6D illustrate that the electronic regulating element 170 may regulate the flow of electrons from the cathode 120 to the ion reservoir 140 and/or the electronic regulating element 170 may regulate the flow of current from the reservoir 140 to the cathode 120. To balance the flow of electrons from the cathode 120 to the ion reservoir 140, the ion reservoir 140 may simultaneously release anions, M", which may then flow through the electrolyte 130 to the cathode 120, thus replacing at least a portion of any anions, M", lost and/or rendered unusable in the cathode 120. Thus, as long as the ion reservoir 140 has a standard reduction potential that is greater than the standard reduction potential of the cathode (e.g. $E^0_{St,B} > E^0_{cat}$ in FIGS. 4A and 4B), the ion reservoir 140 may passively release anions, which may then be transferred through the electrolyte 130 to the cathode 120 to replenish the anion-depleted cathode 120 with "fresh" anions and restoring the cell's performance to something closer to the performance of an ideal cell.

Figure 7A:
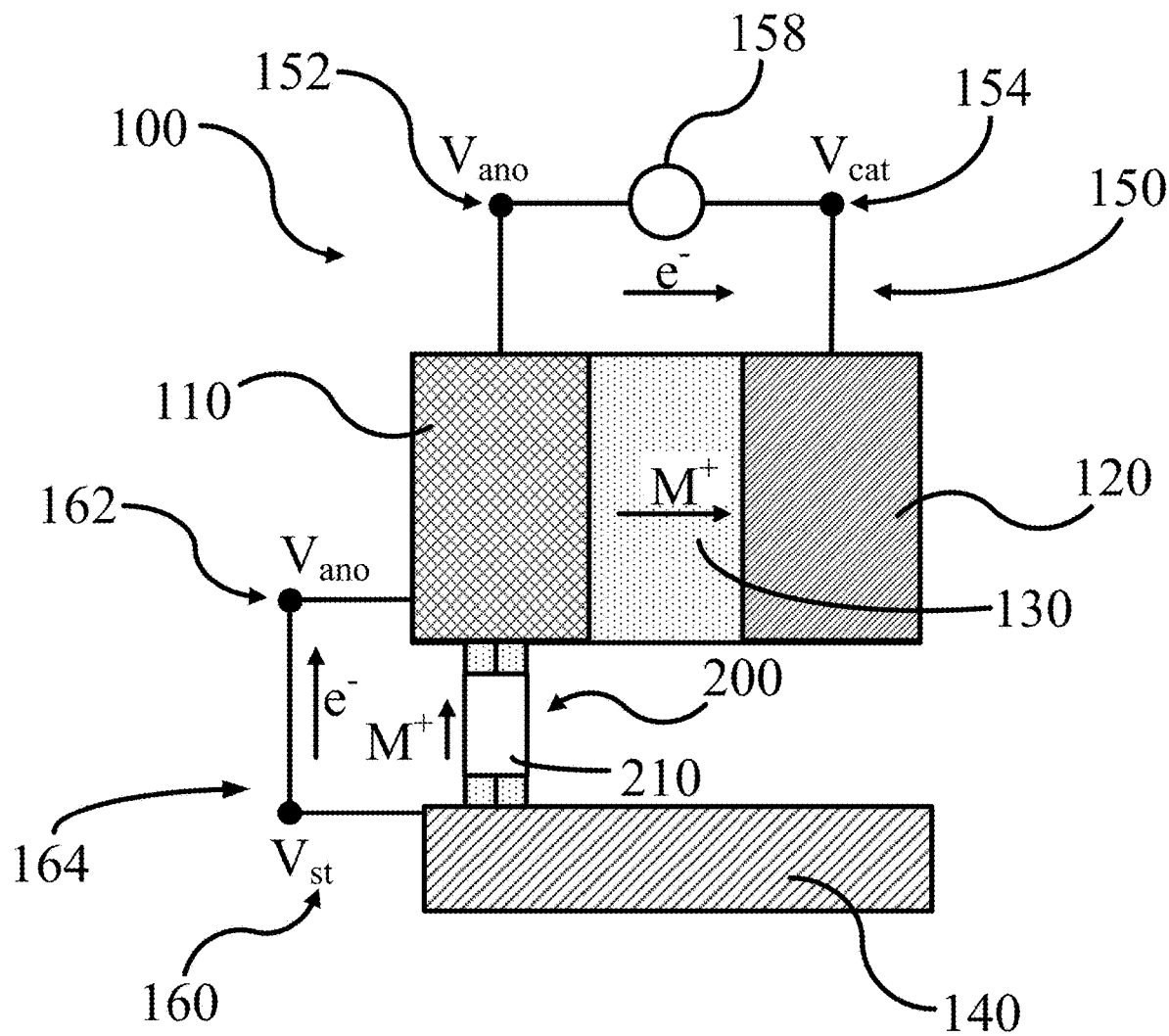
FIGS. 7A and 7B illustrate a rechargeable ion battery utilizing an electrolyte bridge, electronic regulating element, and an ion reservoir, utilizing cations or anions, respectively, according to embodiments of the present disclosure.
Figure 7B:
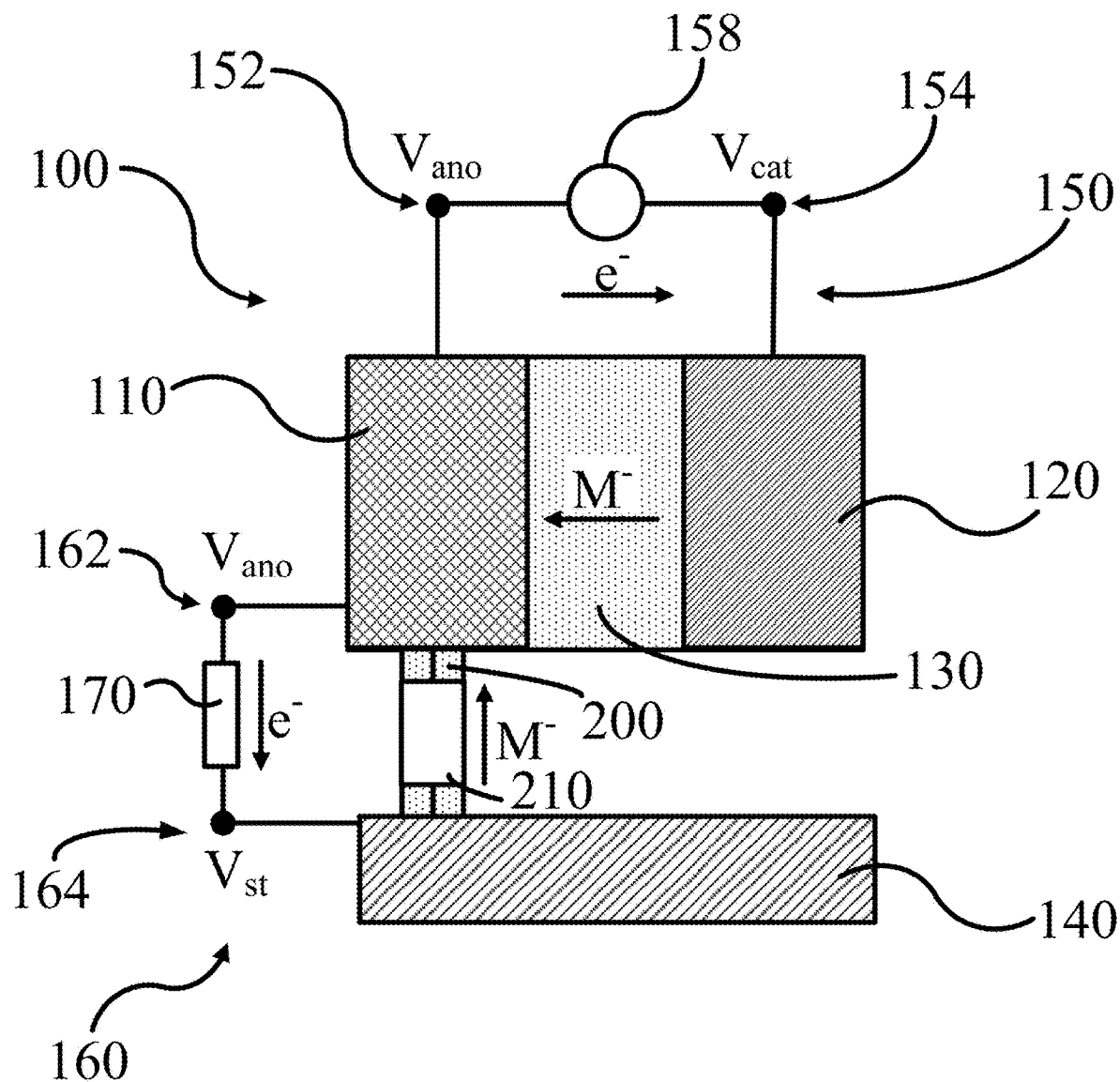

The embodiments illustrated in FIGS. 5A-D and FIGS. 6A-D regulate the flow of ions from an ion reservoir 140 to an electrode (e.g. cathode 120 and/or anode 110) by controlling the flow of electrons through a second circuit using an electronic regulating element 170 that controls the flow of electrons. Thus, in such embodiments, the flow of ions from the ion reservoir 140 to the anode 110 and/or cathode 120 are indirectly regulated in that the flow of charge is controlled by an electronic regulating element 170 that directly controls the flow of electrons, with the flow of ions following indirectly to balance the negative charges flowing to and/or from the anode 110 and/or cathode 120. FIGS. 7A and 7B illustrate a cell 100 according to another embodiment of the present disclosure in which the flow of ions to and/or from the anode 110 and/or cathode 120 may be controlled directly utilizing an ionic regulating element 210 positioned within an electrolyte bridge 200.

FIG. 7A illustrates a rechargeable cell 100 during discharge where the cell 100 utilizes half-cell reactions as shown in Equations (6) and (7) above, utilizing a cation $M^+$ (e.g. $Li^+$). During discharge, a load 158 positioned in a first circuit 150 connecting the cell's anode 110 to its cathode 120 results in the flow of electrons from the anode 110 to the cathode 120, with this flow of negative charge simultaneously balanced by the flow of cations, $M^+$, from the anode 110 to the cathode 120, as described above for FIG. 5B. However, unlike FIG. 5B, the cell 100 of FIG. 7A ionically connects the anode 110 to an ion reservoir 140 using an electrolyte bridge 200 having an ionic regulating element 210 positioned within the electrolyte bridge 200. As used herein, an "electrolyte bridge" refers to a conduit and/or container containing an electrolyte, where the electrolyte is in physical contact with both the cathode 120 or the anode 110 and the ion reservoir 140 such that the cathode 120 or the anode 110 and the ion reservoir 140 are ionically connected. Thus, for the example shown in FIG. 7A, for cases where the ion reservoir 140 has a standard voltage potential lower than the standard voltage potential of the anode 110, electrons will flow from the ion reservoir 140 to the anode 110 through a second circuit 160 and, simultaneously, cations ($M^+$) will flow through the ionic regulating element 210 positioned within the electrolyte bridge 200 containing electrolyte, from the ion reservoir 140 to the anode 110, to balance the negative charge provided by the electron flow through the second circuit 160.

Referring again to FIG. 7A, in this embodiment of a rechargeable cell 100, an anode 110 is ionically connected to a cathode 120 by an electrolyte 130 positioned between the anode 110 and the cathode 120. The electrolyte 130 directly contacts the anode 110 and the cathode 120, thereby providing an indirect physical connection between the anode 110 and the cathode 120 and a path for ions to flow. However, the anode 110 and the cathode 120 are not in direct physical contact. In addition, the anode 110 and the cathode 120 are electronically connected by a first circuit 150. The first circuit 150 directly contacts the anode 110 and the cathode 120, thereby providing an indirect physical connection between the anode 110 and the cathode 120 and a path for electrons to flow. However, the anode 110 and the cathode 120 are not in direct physical contact. So, although ionically and electronically connected by the electrolyte 130 and the first circuit 150, respectively, the anode 110 and the cathode 120 are not in direct physical contact.

Referring again to FIG. 7A, in this embodiment of a rechargeable cell 100, the anode 110 is also ionically connected to an ion reservoir 140 by an electrolyte bridge 200 positioned between the anode 110 and the ion reservoir 140. The electrolyte bridge 200 directly contacts the anode 110 and the ion reservoir 140, thereby providing an indirect physical connection between the anode 110 and the ion reservoir 140 and a path for ions to flow. However, the anode 110 and the electron reservoir 140 are not in direct physical contact. In addition, the anode 110 and the ion reservoir 140 are electronically connected by a second circuit 160. The second circuit 160 directly contacts the anode 110 and the ion reservoir 140, thereby providing an indirect physical connection between the anode 110 and the ion reservoir 140 and a path for electrons to flow. However, the anode 110 and the ion reservoir 140 are not in direct physical contact. So, although ionically and electronically connected by the ion reservoir 140 and the second circuit 160, respectively, the anode 110 and the ion reservoir 140 are not in direct physical contact.

Referring again to FIG. 7A, in this embodiment of a rechargeable cell 100, there is no single element that provides an ionic or electronic connection between the ion reservoir 140 and the cathode 120. Instead, the ion reservoir 140 is indirectly connected ionically to the cathode 120 through the electrolyte bridge 200, the anode 110, and the electrolyte 130. Further, the ion reservoir 140 is indirectly connected electronically to the cathode 120 through the second circuit 160, the anode 110, and the first circuit 150. So, although ionically and electronically connected, the cathode 120 and the ion reservoir 140 are not in direct physical contact.

In some embodiments of the present disclosure, a second circuit 160 may electronically connect an ion reservoir 140 to a cathode 120. Similarly, an electrolyte bridge 200 containing an ionic regulating element 210 may ionically connect an ion reservoir 140 to a cathode 120. In addition, in some embodiments of the present disclosure, cations ($M^+$) may be transferred from the ion reservoir 140 to at least one of the anode 110 and/or the cathode 120 using one or more electrolyte bridges 200 containing one or more ionic regulating elements 210 during both discharge of the cell 100 and charging of the cell 110.

FIG. 7B illustrates a rechargeable cell 100 during discharge where the cell 100 utilizes half-cell reactions as shown in Equations (11) and (12) above, utilizing a cation $M^+$ (e.g. $Br^-$). During discharge, a load 158 positioned in a first circuit 150 connecting the cell's anode 110 to its cathode 120 results in the flow of electrons from the anode 110 to the cathode 120, with this flow of negative charge simultaneously balanced by the flow of anions, $M^-$, from the cathode 120 to the anode 110, as described above for FIG. 6B. However, unlike FIG. 6B, the cell 100 of FIG. 7A ionically connects the anode 110 to an ion reservoir 140 using an electrolyte bridge 200 having an ionic regulating element 210 positioned within the electrolyte bridge 200. Thus, for the example shown in FIG. 7B, for cases where the ion reservoir 140 has a standard voltage potential greater than the standard voltage potential of the anode 110, electrons will flow from the anode 110 to the electron reservoir 140 through a second circuit 160 and, simultaneously, anions ($M^-$) will flow through the ionic regulating element 210 positioned within the electrolyte bridge 200 containing electrolyte, from the ion reservoir 140 to the anode 110, to balance the negative charge removed from the anode 110 by the electron flow through the second circuit 160.

In some embodiments of the present disclosure, a second circuit 160 may electronically connect an ion reservoir 140 to a cathode 120. Similarly, an electrolyte bridge 200 containing an ionic regulating element 210 may ionically connect an ion reservoir 140 to a cathode 120. In addition, in some embodiments of the present disclosure, anions ($M^-$) may be transferred from the ion reservoir 140 to at least one of the anode 110 and/or the cathode 120 using one or more electrolyte bridges 200 containing one or more ionic regulating elements 210 during both discharge of the cell 100 and charging of the cell 110.

Figure 8:
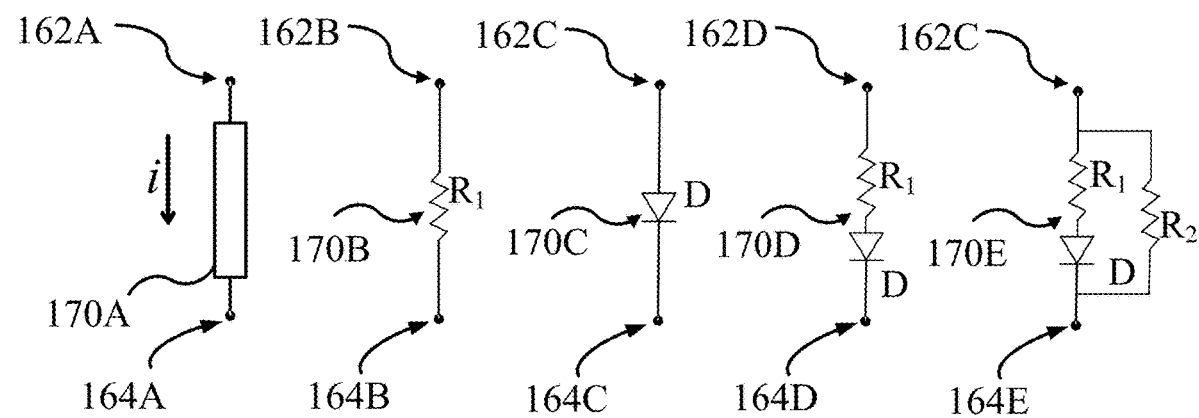
FIG. 8 illustrates regulating elements, according to embodiments of the present disclosure.

FIG. 8 illustrates some embodiments of the present disclosure for a generic electronic regulating element 170 (e.g. 170A through 170E) and/or a generic ionic regulating element 210. As stated above, the purpose of a regulating element (e.g. electronic and/or ionic) is to control the release rate of ions from an ion reservoir 140 to at least one of the anode 110 and/or cathode 120 of a rechargeable cell 100. An electronic regulating element 170 may achieve this by limiting the flow of electrons from the ion reservoir 140 (see FIGS. 5A-D and FIGS. 6A-D). Alternatively, or in addition to, an ionic regulating element 210 may be utilized which controls the flow of ions from the ion reservoir 140 to at least one of the anode 110 and/or cathode 120 of a rechargeable cell 100 (see FIGS. 7A and 7B).

Referring again to FIG. 8, a regulating element (e.g. electronic and/or ionic) may contain a resistor $R_1$ to allow a continuous release of ions (e.g. $M^+$ or $M^-$) from the ion reservoir 140 to an electrode. The release rate may be determined by the potential difference between the terminals (e.g. 162 and 164) divided by the resistance provided by the resistor $R_1$. The purpose of a continuous release of ions from the ion reservoir to an electrode is to increase a cell's charge capacity on a continuous basis and extend lifetime, as illustrated by curve (B) in FIG. 3. Electronic regulating element 170C contains a diode, D, which enables a triggered release of ions from an ion reservoir 140. For an ideal diode, the release of ions from the reservoir only occurs when the potential difference between terminals 162C and 164C exceeds the diode voltage. In some embodiments of the present disclosure, the diode voltage may be selected to match an electrode (e.g. anode 110 and/or cathode 120) and an ion reservoir 140 potential difference such that the release of ions is triggered by discharging the cell slightly below its normal minimum operating voltage. In some embodiments, the diode voltage may be selected to match an electrode (e.g. anode 110 or cathode 120) and an ion reservoir 140 potential difference such that the release of ions is triggered by charging the cell slightly above its normal maximum operating voltage. Triggered release embodiments may increase a rechargeable cell's capacity as a predetermined maintenance action at some midpoint in the cells life (see curve (C) of FIG. 3), or to increase cell capacity as a step during the manufacturing of the cell (FIG. 3, line A, point 8).

Referring again to FIG. 8, electronic regulating element 170D is similar to the electronic regulating element 170C, however, provides a resistor $R_1$ in series with a diode, D. The addition of the resistor, $R_1$, may improve the triggered release design previously described by limiting the release rate of electrons, and hence, as a result, the indirect release of ions, when the trigger is activated. This may prevent situations where ions are released (indirectly) too fast to the electrodes (e.g. anode 110 and/or cathode 120) and, as a result, accumulate in the electrodes at high concentrations near the ion reservoir 140. The resistor, $R_1$, for electronic regulating element 170D, may reduce the release rate to allow sufficient time for ion transport such that ions spread uniformly throughout the electrode being replenished. Compared to an ideal diode, real diodes typically have an inherent internal resistance property that may sufficiently limit ion release rate providing the operational characteristic of regulating element 170D shown in FIG. 8, without the need to add an additional resistor, $R_1$, in series with the diode, D.

Referring again to FIG. 8, electronic regulating element 170E combines the continuous release feature of 170B and triggered release feature of 170D in a parallel arrangement. The resistors, $R_1$ and $R_2$, and the diode, D, may be chosen to optimize the cell's capacity versus lifetime characteristic. Compared to typical performance and degradation behavior (see curve (D) of FIG. 3), regulating element 166E may be used to achieve a higher "as-shipped" cell capacity as well as a reduced rate of performance degradation, extending lifetime (see curve (A) of FIG. 3). Similar ionic resistor and ionic diode devices may also be configured to directly control the flow of ions using ionic regulating elements 210, with similar ionic regulating elements 210 existing for each of the electronic regulating elements 170 illustrated in FIG. 8.

Figure 9:
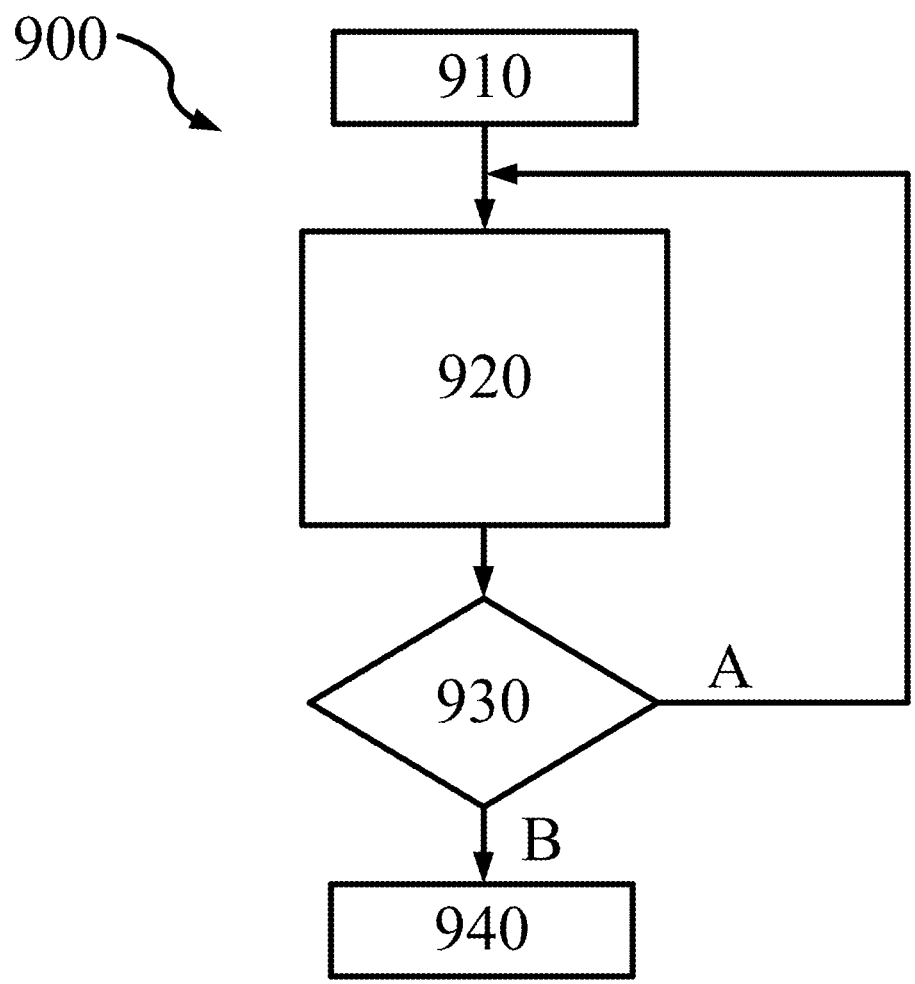
FIG. 9 illustrates a method for the continuous replenishment of ions (e.g. cations or anions) to replace ions lost from a rechargeable cell, according to embodiments of the present disclosure.

FIG. 9 illustrates a method for the continuous replenishment of ions (e.g. cations or anions) to replace ions lost from a rechargeable cell (e.g. due to degradation processes), to provide a cell performance curve that is similar to that shown in curve (B) of FIG. 3. The method of FIG. 9 may start during the cycling steps that occur during manufacture of the cell, or the method may start when the cell is implemented in its normal operational environment (e.g. in an EV). For either case, the method will then continuously release ions from an ion reservoir, which are transferred to at least one of the electrodes (e.g. cathode and/or anode) of the cell through an electrolyte physically connecting the ion reservoir to at least one of the electrodes. As described above, continuous release of ions from the ion reservoir to at least one of the electrodes may be accomplished using one or more resistor and/or diode elements. Once the cell's charge capacity is depleted, as represented by curve (E) of FIG. 3, the cell's useful life-span has ended and the cell may then be replaced with a fresh cell. So, in summary, a method 900 may start 910, for example during the manufacturing of a rechargeable, or while the cell is in service, with the continuous releasing 920 of ions from a reservoir to replenish the ions available by the cell. At some predefined time schedule, or continuously, a decision 930 may be evaluated to determine whether the continuous releasing 920 should be continued (path A), or whether the cell has reached a point where the continuous releasing 920 should be terminated (path B).

Figure 10:
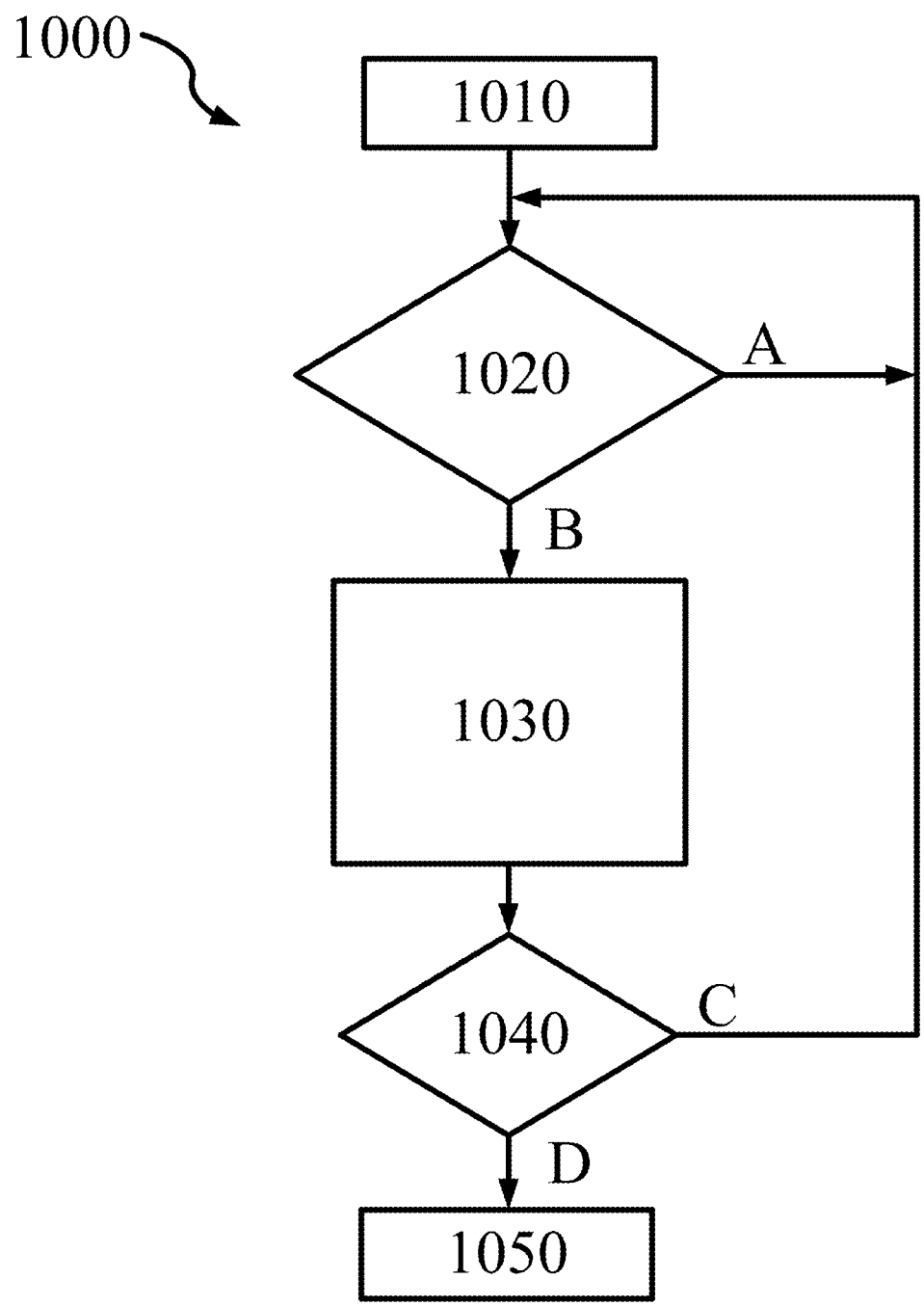
FIG. 10 illustrates a method for the triggered ion release/replenishment of ions (e.g. cations or anions) to replace ions lost from a rechargeable cell, according to embodiments of the present disclosure.

FIG. 10 illustrates a method 1000 for the triggered ion release/replenishment of ions (e.g. cations or anions) to replace ions lost from a rechargeable cell (e.g. due to degradation processes), to provide a cell performance curve that is similar to that shown in curve (C) of FIG. 3. Thus, the method of FIG. 10 may be triggered at some point in the cell's operating life-span. For example, for the case of a rechargeable cation-cell (e.g. Li-ion), Li$^+$ release from an ion reservoir may be triggered when the difference of the voltage potential of at least one of the cell's electrodes, $V_{elec}$ equal to $V_{cat}$ and/or $V_{ano}$, minus the standard voltage potential of the ion reservoir, $E_{st}^o$, is less than a predefined trigger target voltage, $V_T$. So, as shown in FIG. 10, after the method 1000 is started 1010, a triggered releasing 1030 may begin, via path B, as determined by a calculating 1020 of some predefined metric, e.g. $V_T$. Until the release is triggered by the calculating 1020, the method 1000 will continue to cycle through Path A, until the key set-point metric, e.g. $V_T$, is achieved. Similarly, for the case of a rechargeable anion-cell (e.g. Br-ion), Br$^-$ release from an ion reservoir may be triggered when the difference of the voltage potential of at least one of the cell's electrodes, $V_{elec}$ equal to $V_{cat}$ and/or $V_{ano}$, minus the standard voltage potential of the ion reservoir, $E_{st}^o$, is greater than a predefined trigger target voltage, $V_T$. For either case, once triggered, the method may then continuously release ions (via Path C in FIG. 10) from the ion reservoir, which are transferred to at least one of the electrodes (e.g. cathode and/or anode) of the cell through an electrolyte physically connecting the ion reservoir to at least one of the electrodes, as long as the trigger condition is met. As described above, the triggered release of ions from the ion reservoir to at least one of the electrodes may be accomplished using at least one diode. In some embodiments, at least one diode may be used in combination with one or more resistors to more finely tune when ions are released from the ion reservoir and the rate at which they are released. Once the cell's charge capacity is depleted, as determined by decision step 1050, as represented by curve (E) of FIG. 3, the cell's useful life-span has ended, the method 1000 may end 1050 (via Path D) and the original cell may then be replaced with a fresh cell.

Figure 11A:
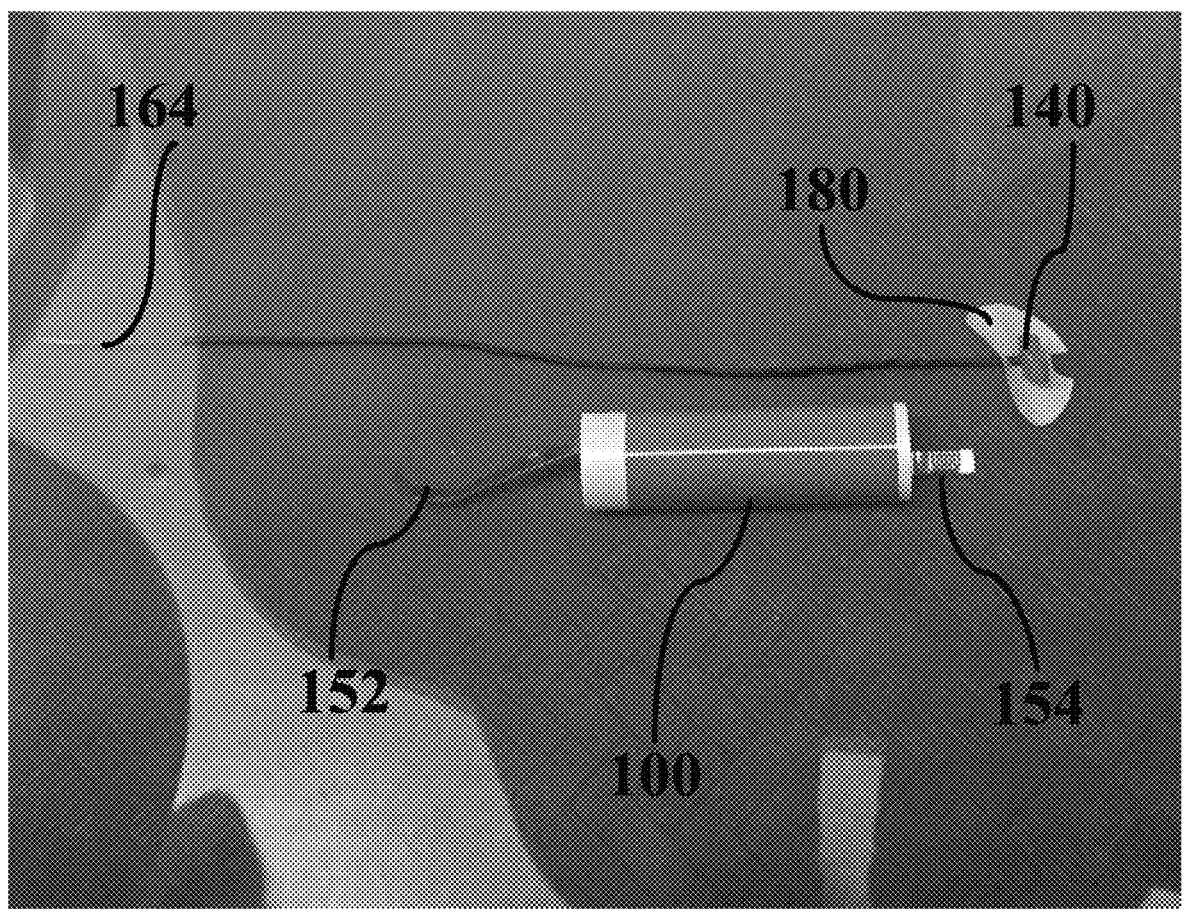
FIGS. 11A-E illustrate an experimental setup used for testing commercial Li-ion batteries, according to embodiments of the present disclosure.
Figure 11B:
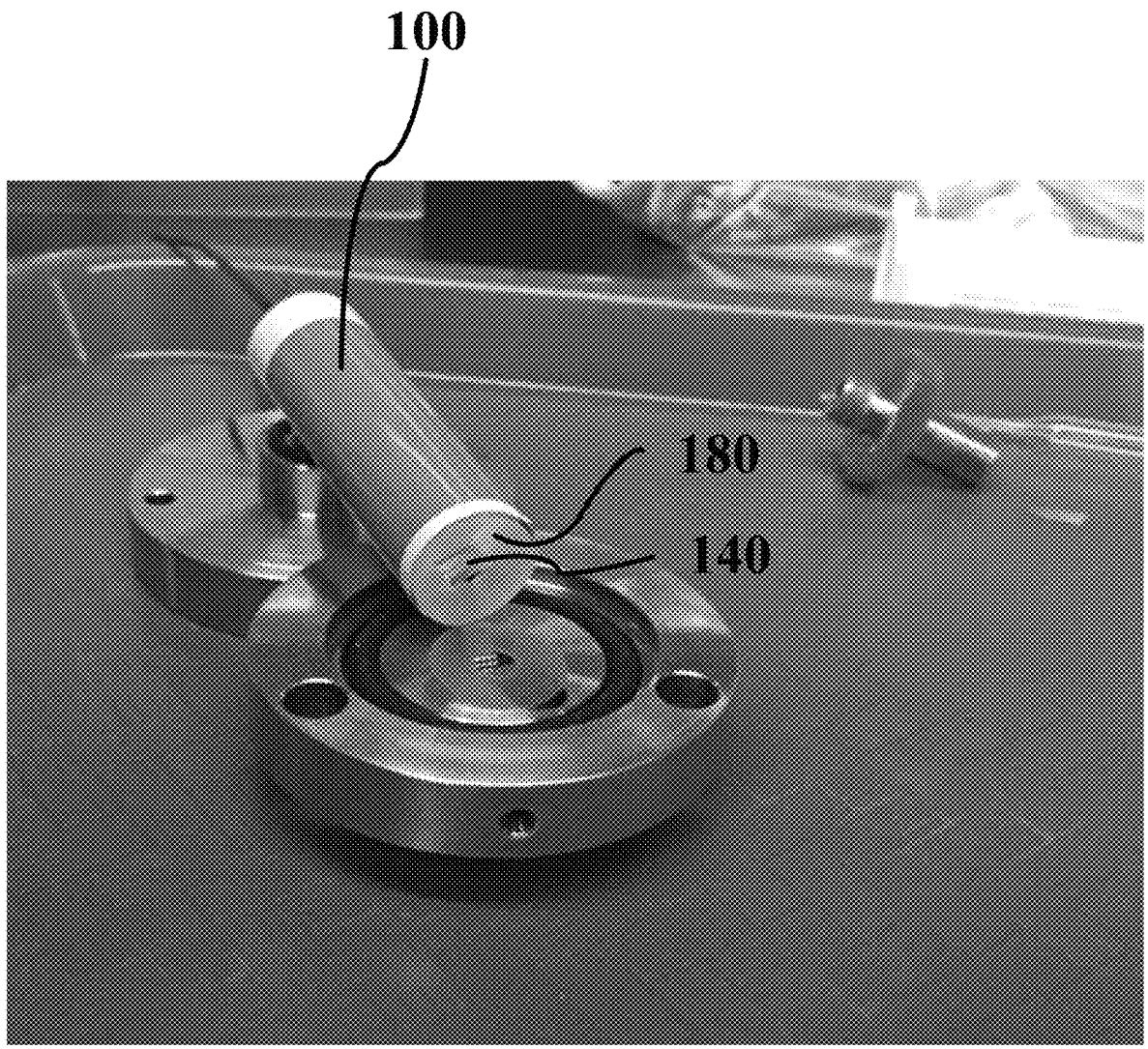
Figure 11C:
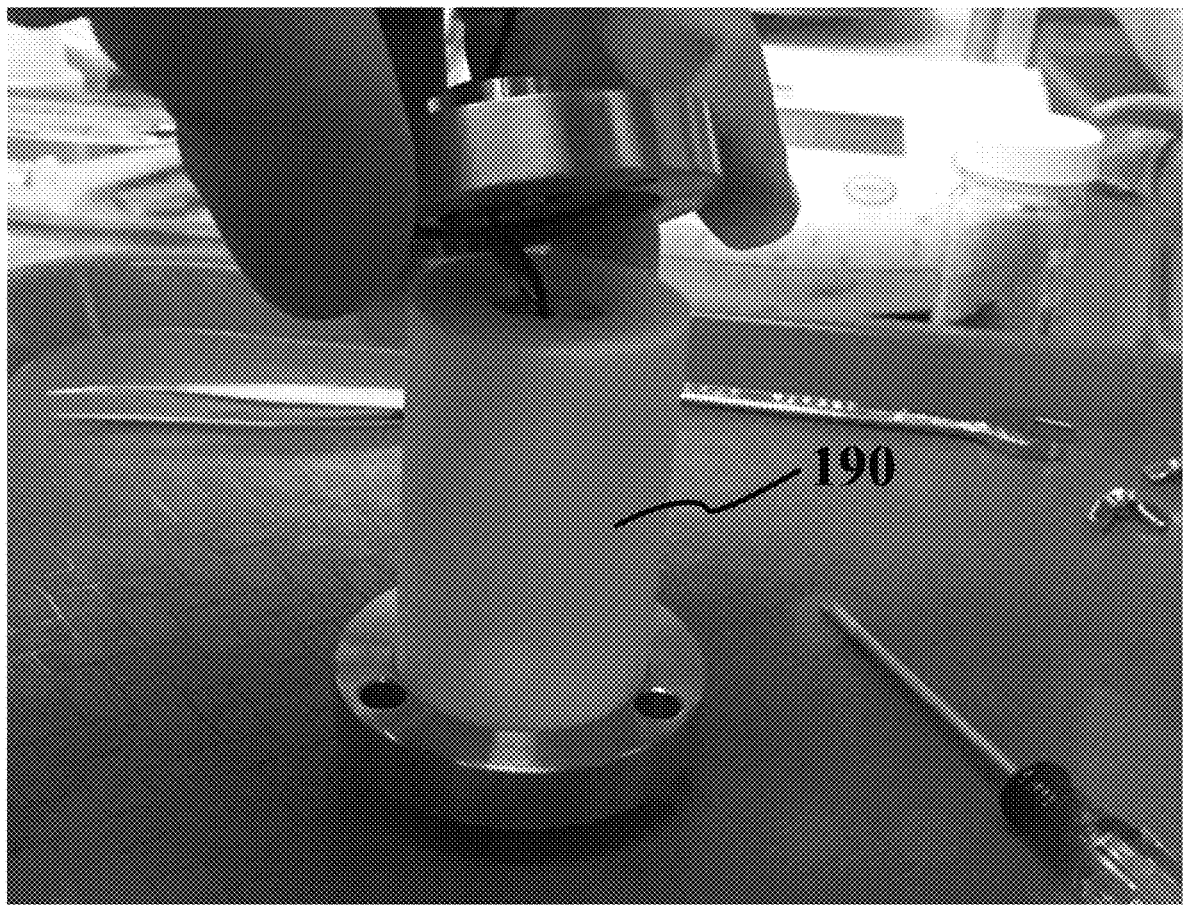
Figure 11D:
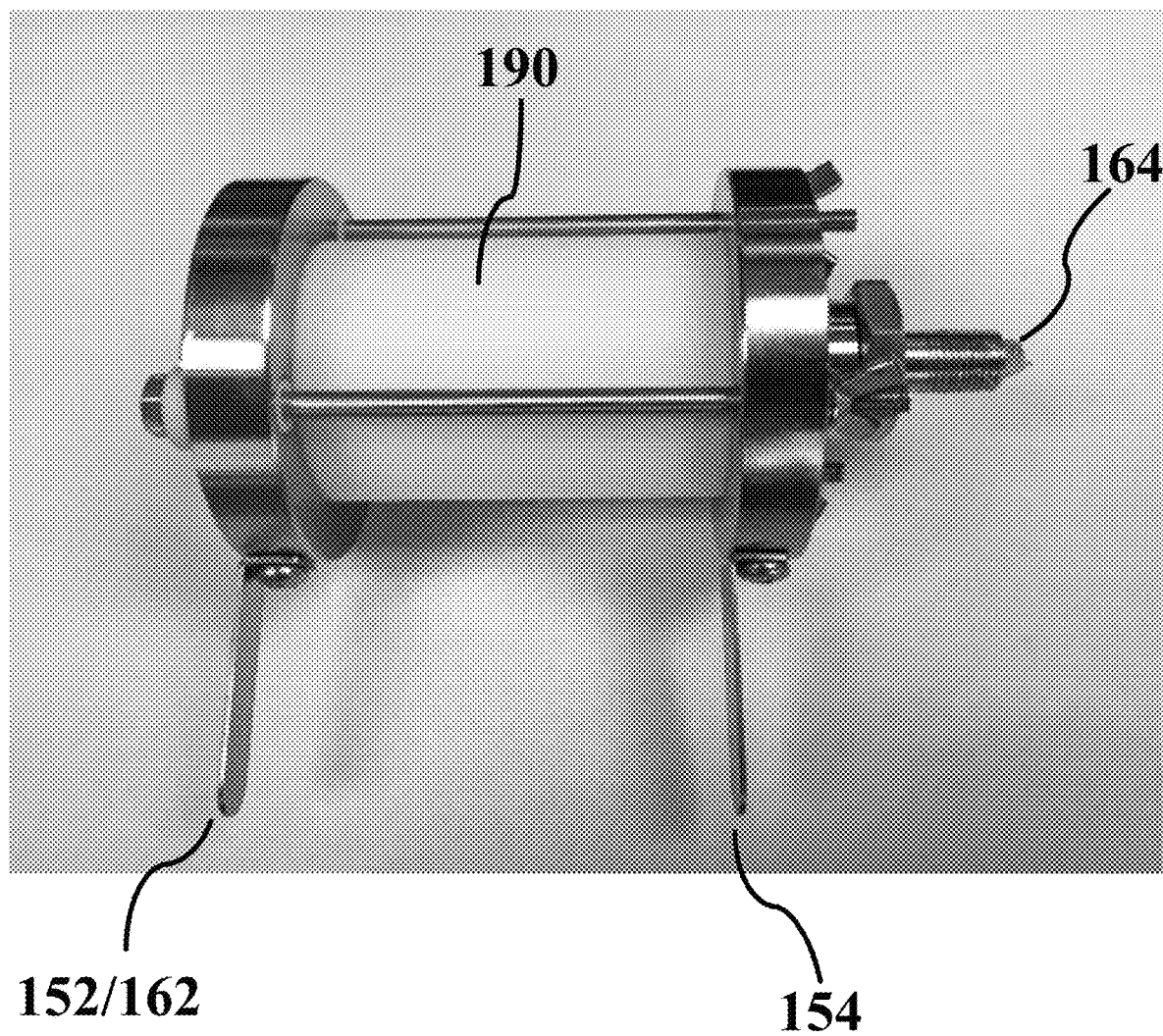
Figure 11E:
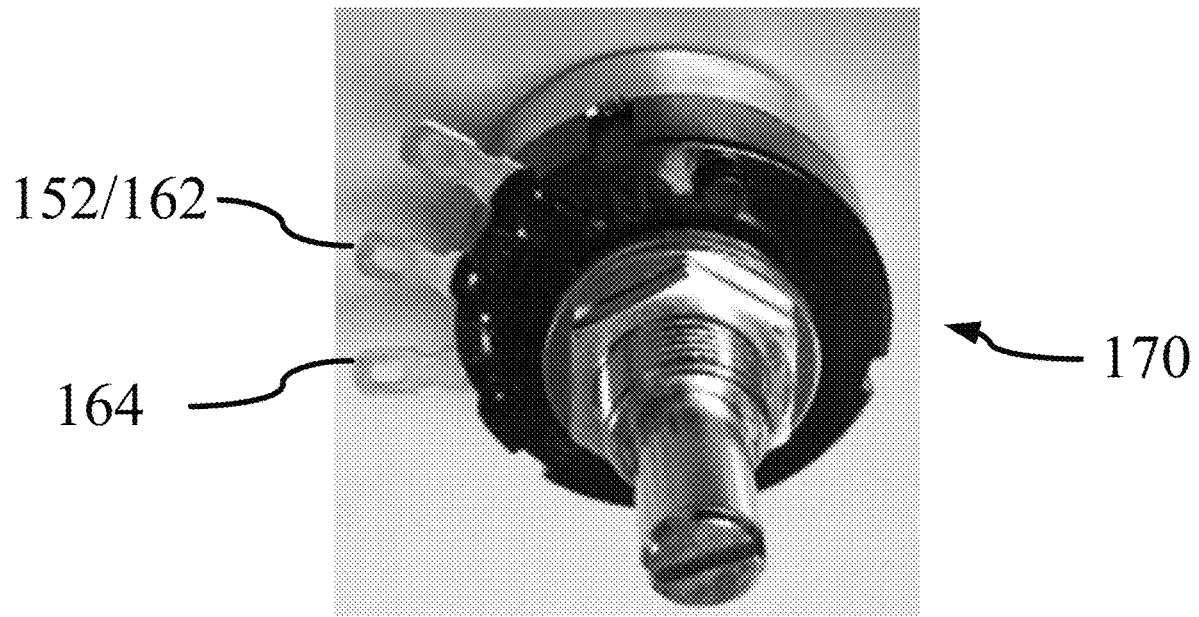

FIGS. 11A through 11E show an experimental setup used for testing the concept using commercial wound electrode Li-ion batteries in the form of a jellyroll. FIG. 11A shows the wound cylindrical-shaped jellyroll, together with a small disk of Li metal that is covered with separator material and, in FIGS. 11B-C, placed inside the cell fixture beneath the jellyroll. The cell fixture (FIG. 11D) has three external terminals for anode 152, cathode 154, and the metallic Li storage reservoir 164. In some tests, a rheostat (FIG. 11E) is used as electronic regulating element 170 and connected between one of the external electrode terminals (e.g. 152/162) and the reservoir "fourth" terminal 164.

Figure 12:
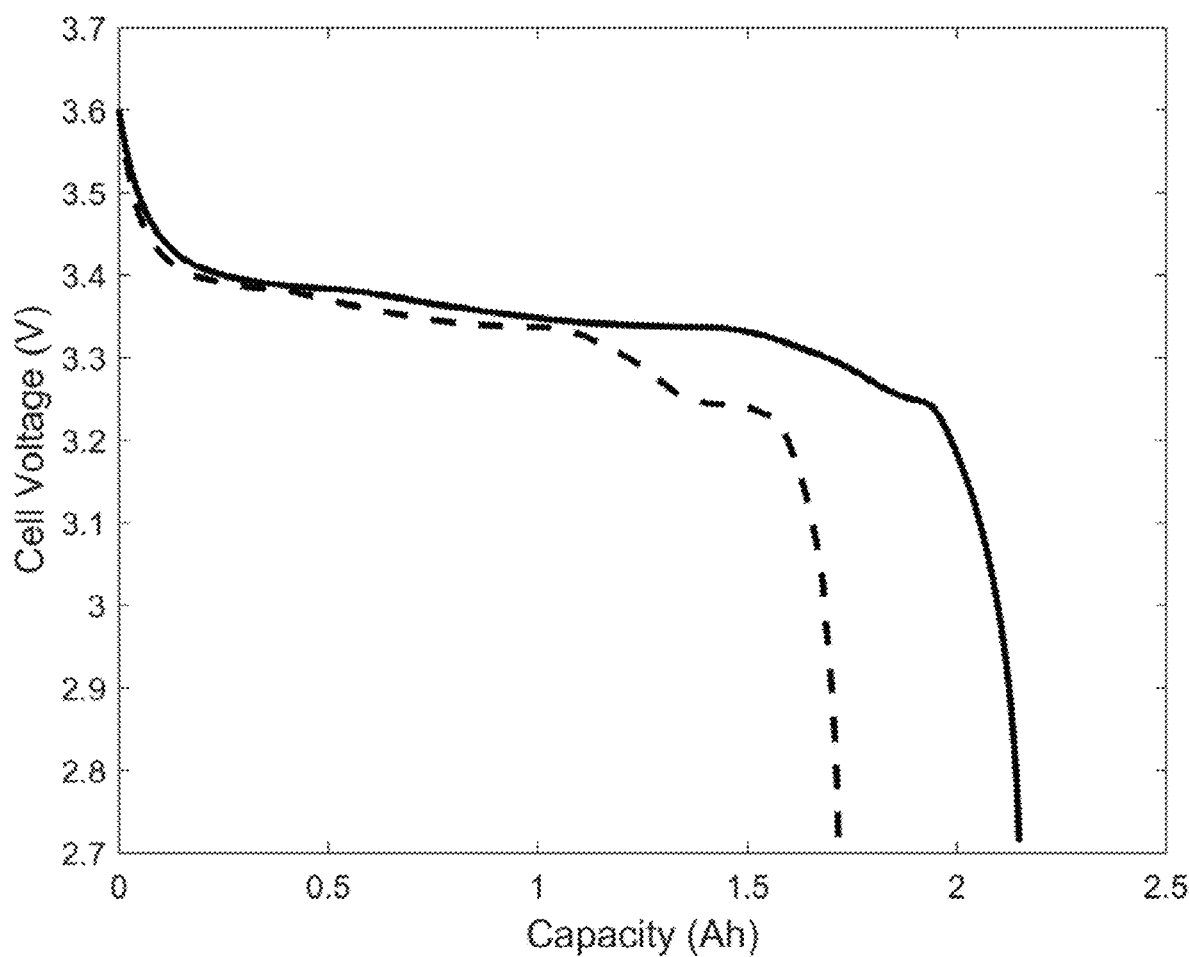
FIG. 12 illustrates experimental data obtained from a lithium-ion battery having at least a portion of its original capacity replenished utilizing a metal lithium ion reservoir, according to embodiments of the present disclosure.

An A123 2.2-Ah cylindrical-wound graphite/iron-phosphate cell was aged for 7 years by storing it at room temperature, degrading it to 1.72 Ah, or 78% of nameplate capacity (dashed line). The cell was opened in a glove-box and installed into a test fixture along with the metallic Li reservoir. Filled with electrolyte and with the cell sealed, the cell's negative electrode (anode) was re-lithiated versus the Li storage reservoir. Almost all of the original capacity of the cell (solid line, FIG. 12) was recovered, to 2.17 Ah. This demonstrates the ability to recover cell capacity by replenishing lost ions.

Figure 13:
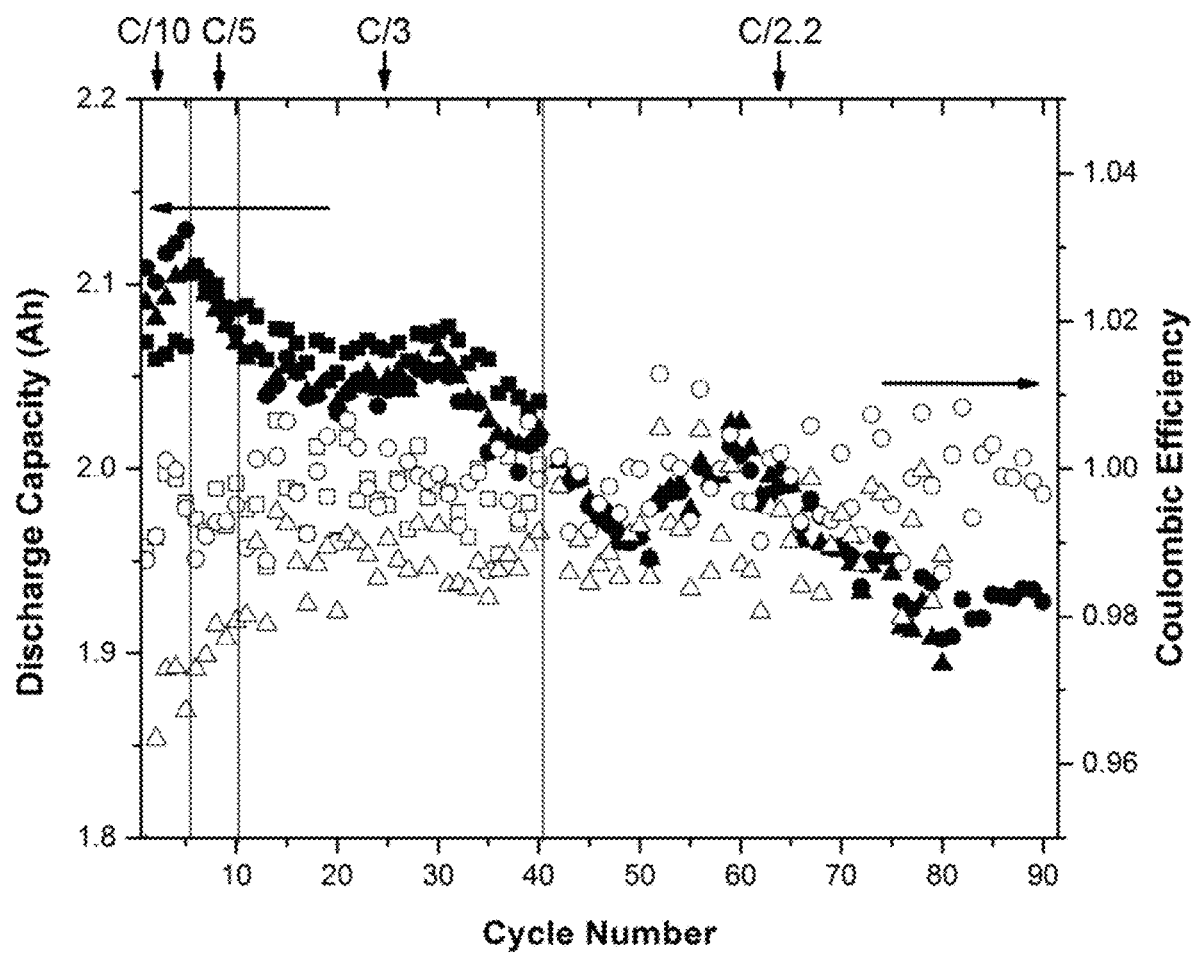
FIG. 13 illustrates capacity fade versus cycle number experimental data, according to embodiments of the present disclosure.

FIG. 13 shows an example of capacity fade versus cycle number and calendar time for a cylindrical-wound graphite/NMC Li-ion cell. Cell 1 is a control cell with no Li reservoir. Cells 2 and 3 contain Li reservoirs at two locations within the cell. FIG. 13 serves as baseline data showing capacity fade typical of the Li-loss degradation mechanism in commercial Li-ion cells. Square, circle, and triangle symbols provide data for cells 1, 2, and 3, respectively. Filled symbols correspond to the left axis; open symbols correspond to the right axis. Cells 2 and 3 contained a metallic Li reservoir as shown in FIG. 11. Cell 1, as a control, did not. Reservoir ion release was not tested due to a premature failure of the electrical connections within these prototype cells. The capacity fade of all three cells tracks with square-root-of-time, indicative of the diffusion-limited SEI growth Li-loss degradation mechanism. Capacity fade rate increases as the cells are cycled under progressively higher C-rates.

Figure 14A:
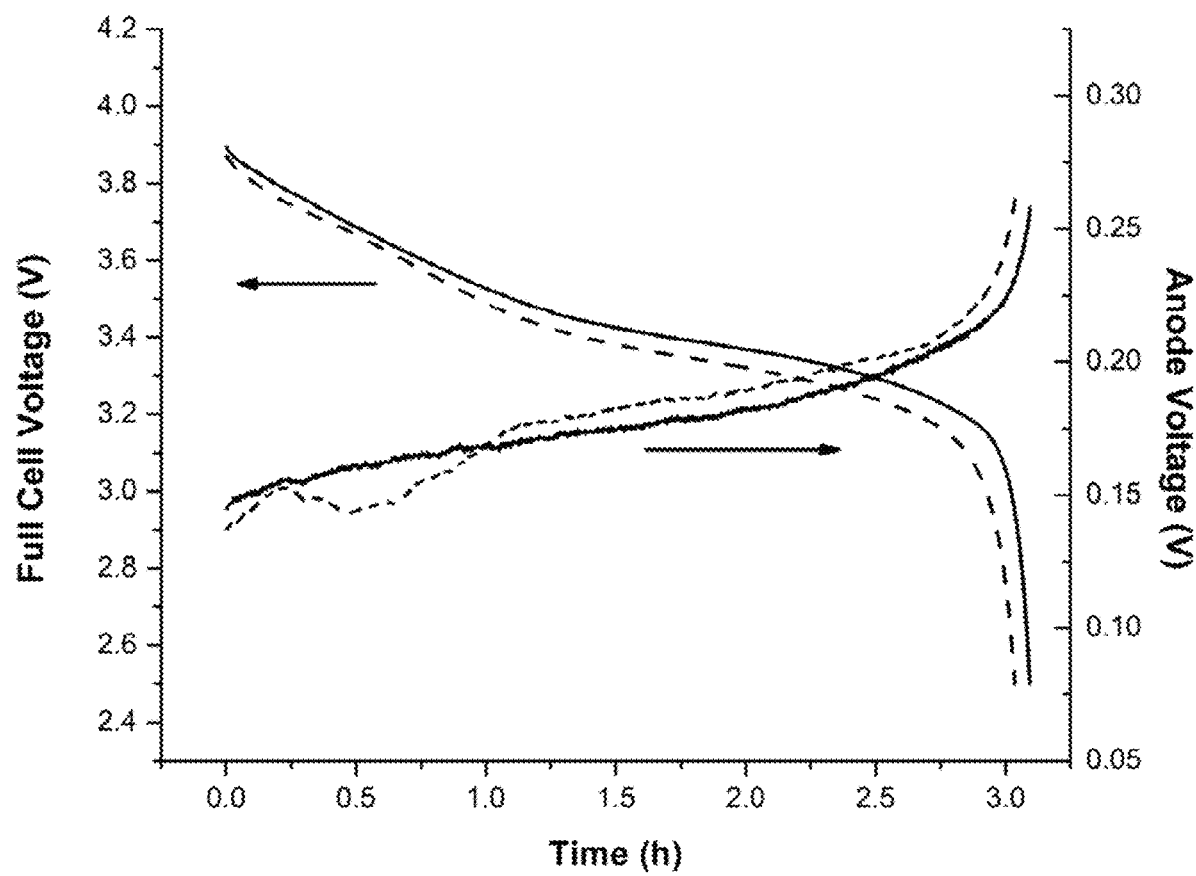
FIGS. 14A-C illustrates cell aging study data, according to embodiments of the present disclosure.

FIG. 14 shows data for Cell 3 of the graphite/NMC cell aging study at cycles 11 and 40, both conducted at the C/3 rate. Solid lines show data for cycle 11; dashed lines show data for cycle 40. Between cycles 11 and 40, the cell loses approximately 3% capacity, indicated by full cell voltage data on the left axis. Depletion of Li in the anode is responsible for this full-cell capacity loss. This is indicated on the right axis by an identical shift in the anode half-cell voltage to the left by 3%. Were extra Li introduced into the anode, the anode voltage curve would shift back to the right, enabling a recovery of the 3% lost cell capacity.

Figure 14B:
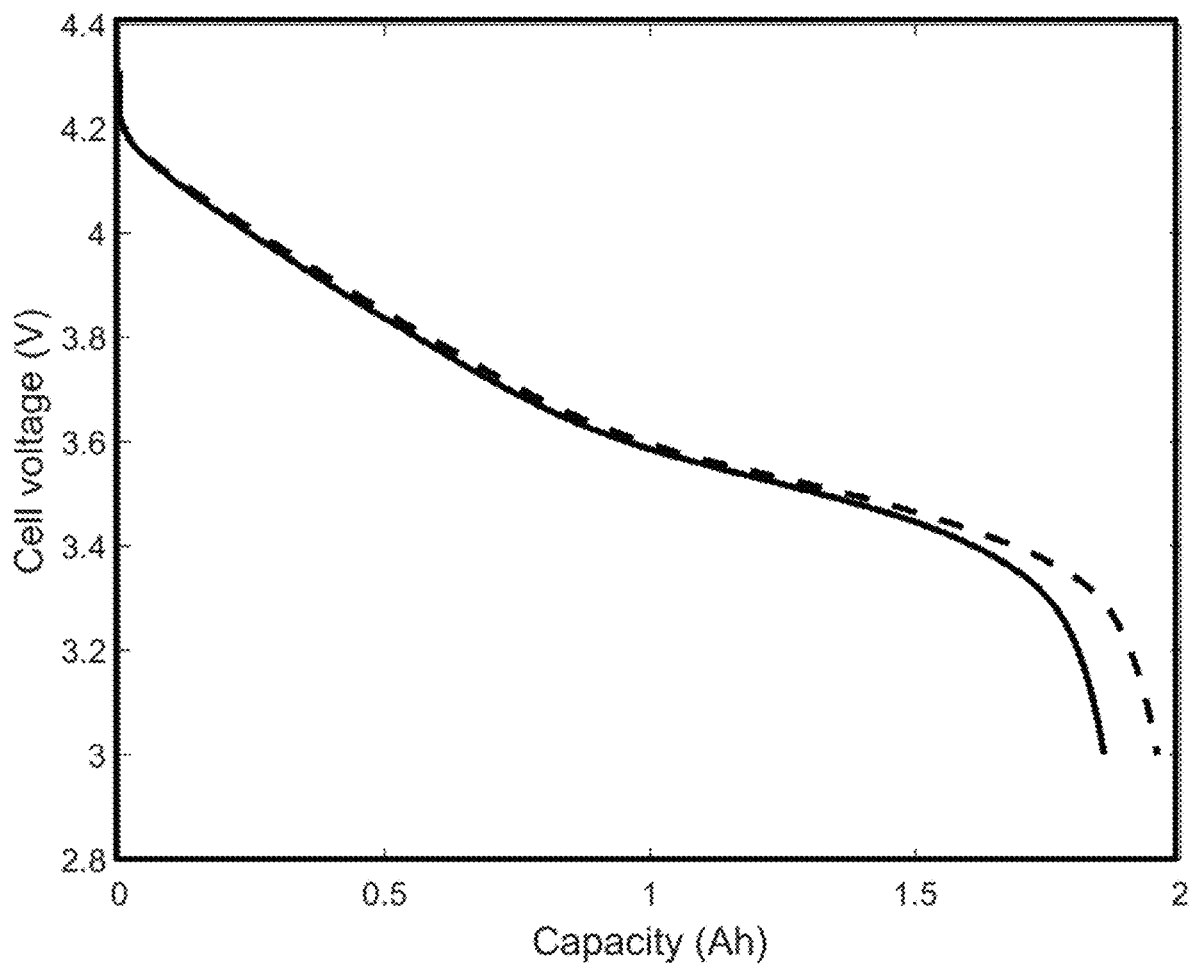

FIG. 14B shows data for Cell 4 of a subsequent graphite/NMC cell aging study. The cell was aged in a modified fixture with improved electrical connectivity to the Li reservoir. Cell capacity decreased from 2.1 Ah to 1.8 Ah over 425 cycles, a loss of 14% capacity. The cell was fully discharged and the cathode lithiated by applying a galvanostatic current between the Li reservoir and cathode. Before lithiation (solid line), the cell had 1.80 Ah capacity. In the first cycle after lithiation (dashed line), the cell had 1.89 Ah capacity, a 5% increase. In the second cycle after lithiation (dotted line), the cell maintained the same 1.89 Ah capacity, demonstrating stable capacity recovery.

Figure 14C:
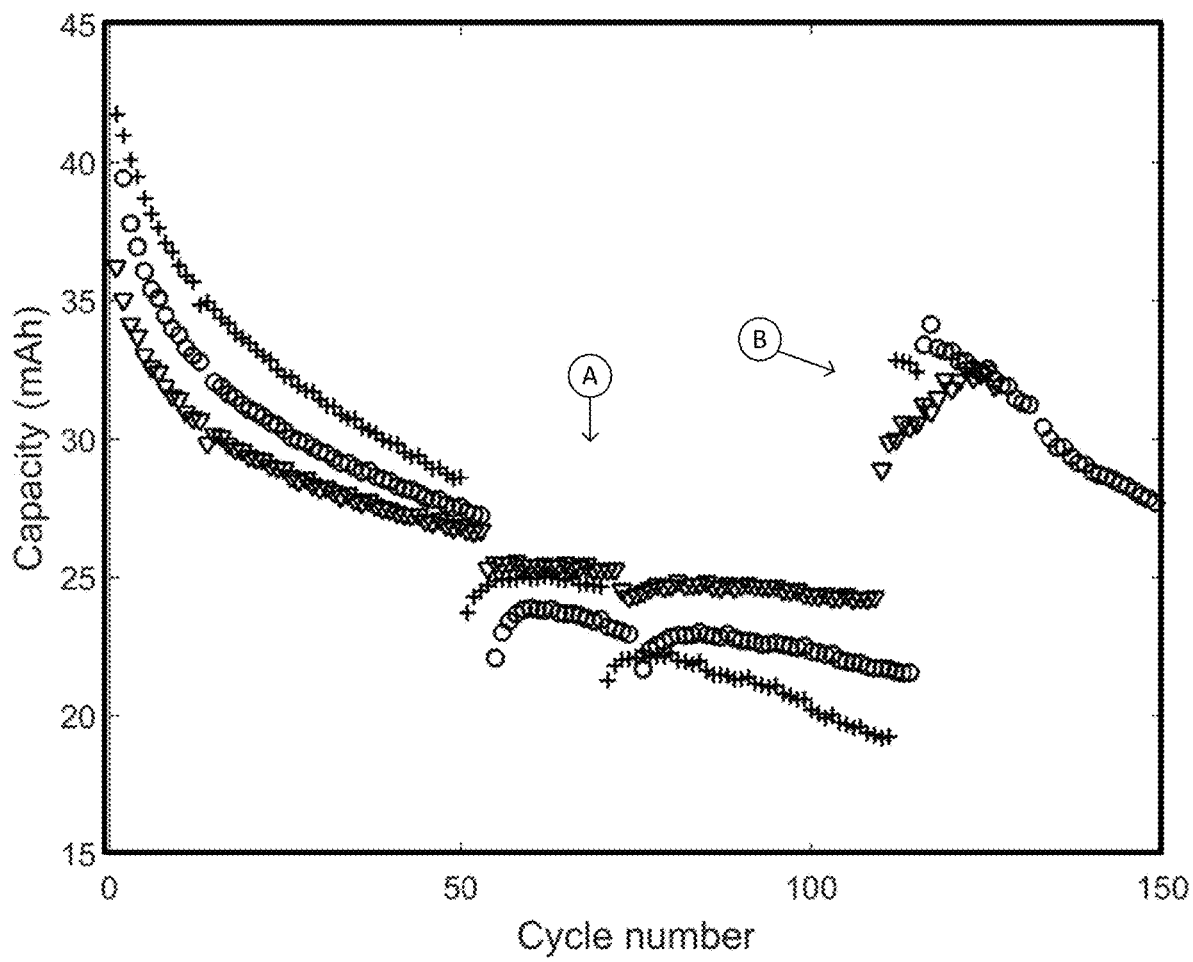

FIG. 14C shows aging data for graphite/lithium-manganese-oxide (LMO) single-layer pouch cells. A small metallic Li reservoir was installed between the anode and cathode sheets of the three cells. Region A of the data shows normal capacity degradation with cycling. Occasional bumps in the otherwise smooth trends are artifacts of pauses in the test. Region B shows data after relithiation. Cell 1 (cross symbols) was cycled from 3.0 to 4.45V; cell 2 (circle symbols) from 3.0 to 4.35 V; cell 3 (triangle symbols) from 3.0 to 4.2V. Due to its high 4.45V end-of-charge voltage, cell 1 had the highest initial capacity of 42 mAh, however its capacity also degraded the fastest. At cycle 111, cell 1 had just 19 mAh capacity remaining. Following galvanostatic relithiation of the Li reservoir into the cathode, cell 1 capacity recovered to more than 32 mAh which it maintained from cycles 112 to 115. Cell 2 had 39 mAh capacity at cycle 1, degrading to 22 mAh at cycle 114. Following galvanostatic relithiation of the reservoir into the cathode, cell 2 recovered to 33 mAh at cycle 115. Cell 3 had 36 mAh capacity at cycle 1, degrading to 24 mAh at cycle 109. Unlike cells 1 and 2, relithiation of cell 3 was conducted passively, without any external power source, by connecting a rheostat set to a constant resistance between the cathode and reservoir terminals. After a 2-day rest period in this state, capacity jumped to 29 mAh at cycle 110. Cycling resumed with the rheostat left connected. Capacity continued to climb, recovering to 32 mAh at cycle 124. In summary, the data show the 3 cells aged under different conditions recovered anywhere from 22% to 31% capacity as a result of relithiation. Cell 3 (triangle symbols) was relithiated in a passive manner, by means of electronic regulating element 170B of FIG. 8.

Figure 15:
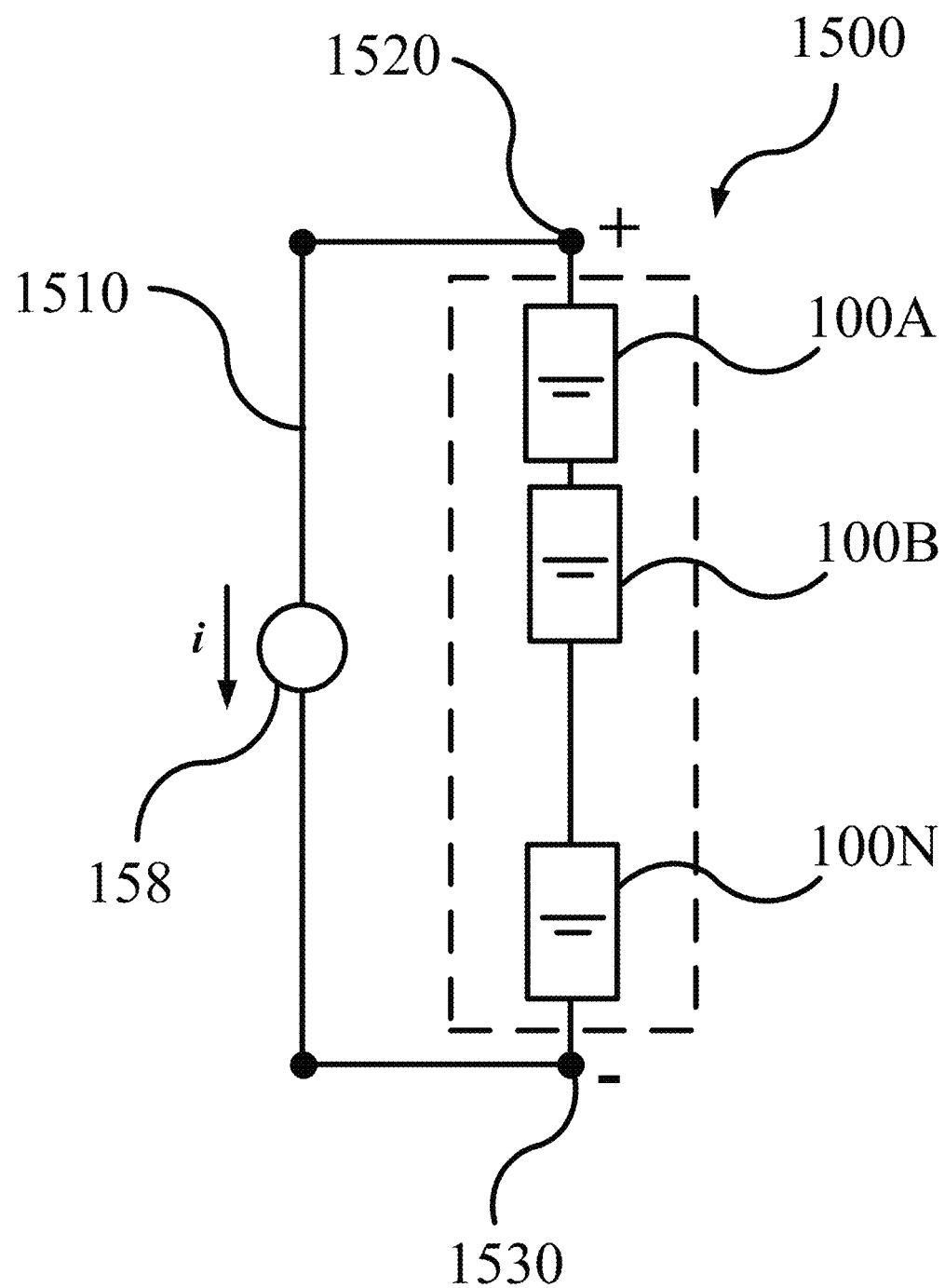
FIG. 15 illustrates rechargeable ion-battery cells configured in series, according to embodiments of the present disclosure.

Individual battery cells, or blocks of parallel-connected cells ("unit cells") are commonly joined in series to increase the battery voltage to match the requirements of the load. FIG. 15 shows a series string of such unit cells. An issue with series connected unit cells is that the ampere-hour capacity of the string is limited by the weakest unit cell in the series string. This is not a problem at beginning of life when cells are well matched in capacity. But over the course of life, individual cells will age differently due to differences in temperature and small non-uniformities in manufacturing quality. With passive cell balancing, battery pack capacity is limited by the weakest unit cell in the series string. The weakest unit cell will thus drive the end of life of the entire battery pack. Active cell balancing systems may be used to shuttle energy between strong and weak cells, however they are typically not used due to added expense, poor efficiency, and added volume and weight. By selectively extending the life of the weakest cell, the life of the series string battery pack is extended.

In some embodiments of the present disclosure, an ion reservoir may preferentially boost the capacity of weak capacity cells (or unit cells) in a series string to match strong capacity cells (or unit cells). Consider a series string of two Li-ion cells where one cell has 20% less capacity than the other due to a deficiency in ion inventory. When discharged, the ion deficient cell's voltage drops lower than the ion sufficient cell. This is because the anode of the ion deficient cell becomes depleted of Li sooner, causing the anode voltage to rise. With the anodes of both cells connected to a Li storage reservoir using a regulating element such as 170B (see FIG. 8), the weaker capacity ion-deficient cell has a larger driving force that will cause Li replenishment from its reservoir at a faster rate. This causes a natural balancing effect whereby the weaker capacity cell is replenished with ions faster than the stronger capacity cell.

Figure 16:
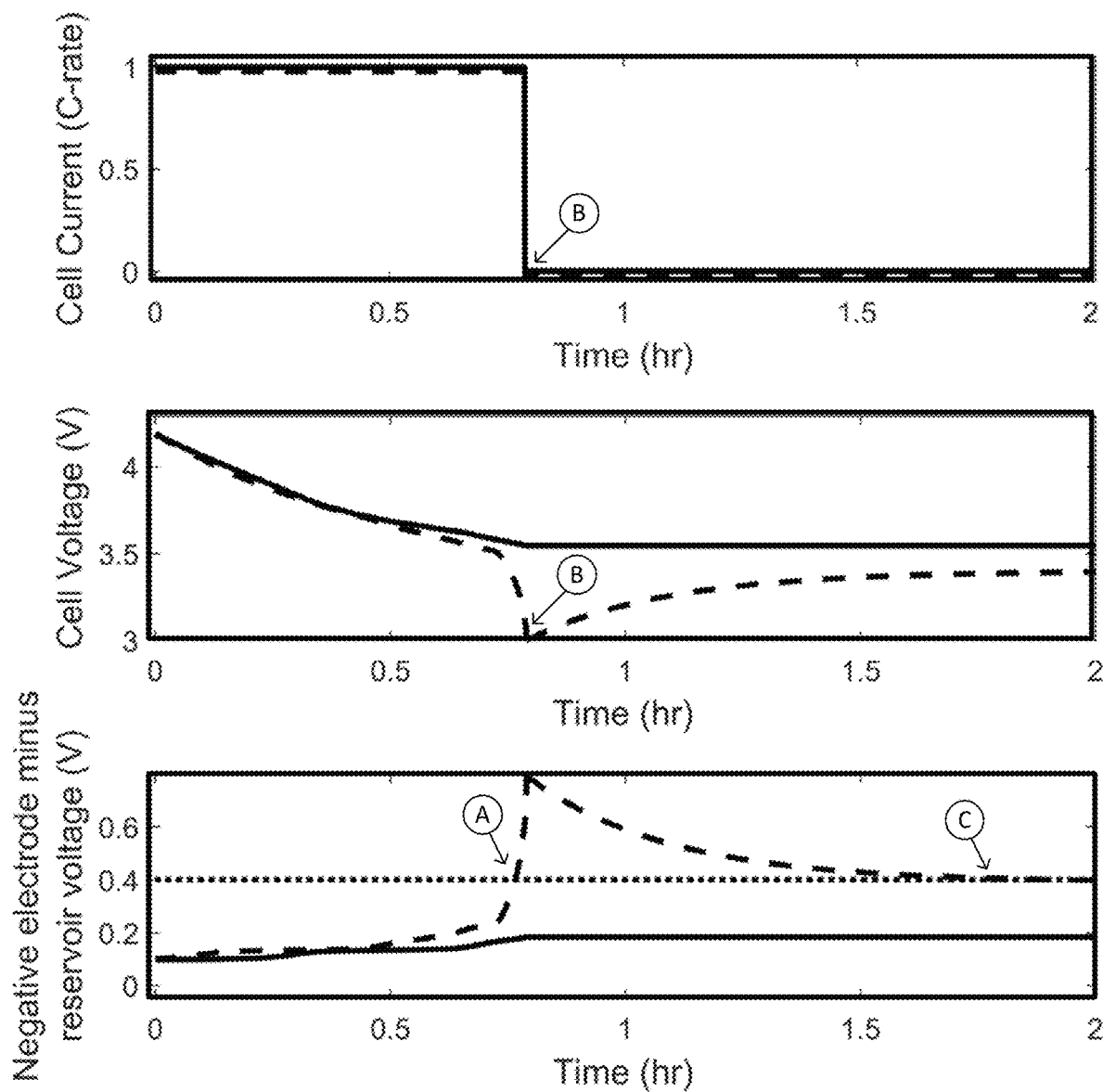
FIG. 16 illustrates simulated data collected from a rechargeable battery constructed using two cells in series, according to embodiments of the present disclosure.

Consider the case shown in FIG. 16 where the two unit cell series string includes an ion reservoir and a regulating element with a trigger circuit such as 170C, 170D, or 170E (see FIG. 8). Initially the weak cell has 20% less capacity than the strong cell. During discharge, the weak cell's voltage decays faster than the strong cell's voltage. At point A of FIG. 16, the weak cell's difference between anode voltage and reservoir voltage exceeds the diode voltage, and the reservoir begins to release ions into the anode. At point B, the cell hits the minimum voltage limit and the load is shut off. After this point, the cell rests at open circuit, with the external load no longer applied. The ion release continues until the anode is sufficiently replenished such that the anode minus reservoir voltage equalizes with the diode voltage at point C, causing the regulating element to halt the release of ions. By the end of this single discharge and rest period, the weak cell has regained 2.5% of its capacity and now has only 17.5% less capacity than the strong cell. With subsequent charge/discharge cycles between the maximum and minimum cell voltage limits, the weak cell will continue to gain capacity via relithiation until it is nearly balanced with the strong cell that experiences no relithiation. Diode voltages and cell voltage operating limits may be readily chosen to tune the capacity recovery behavior of a battery cell as desired for a given application. Cell capacity balancing within a series string may be automatically achieved, triggered by normal discharging or charging of the string without the need for external circuitry.

EXAMPLES

Example 1

An electrochemical device comprising: a first electrode; an ion reservoir electronically connected to the electrode by a first circuit; an electrolyte positioned between the first electrode and the ion reservoir and ionically connecting the first electrode and the ion reservoir; and a regulating element, wherein: the regulating element is positioned between the first electrode and the ion reservoir, the regulating element electronically or ionically connects the ion reservoir and the first electrode, and the regulating element limits the transfer of at least one of electrons or ions between the ion reservoir and the first electrode.

Example 2

The electrochemical device of Example 1, wherein the ion reservoir comprises a solid capable of being oxidized according to a first reaction comprising $M \leftrightarrow M^{n+}+ne^-$ having a first standard reduction potential $E_{St}^0$, M is an element, and n is an integer value greater than zero.

Example 3

The electrochemical device of Example 2, wherein the solid comprises at least one of lithium, magnesium, aluminum, potassium, zinc, or vanadium.

Example 4

The electrochemical device of Example 2, wherein $M^{n+}$ comprises at least one of $Li^+$, $Na^+$, $K^+$, $Fe^{3+}$, $Cu^{2+}$, $V^{2+}$, or $Mg^{2+}$.

Example 5

The electrochemical device of Example 2, wherein: the first electrode behaves as a cathode capable of being reduced according to a second reaction comprising $X+M^{n+}+ne^- \leftrightarrow MX$ having a second standard reduction potential $E_{cat}^0$, X comprises an element, and $E_{St}^0 < E_{cat}^0$.

Example 6

The electrochemical device of Example 5, wherein X comprises at least one of $FePO_4$, $FeCl_3$, $Mn_2O_4$, $CoO_2$, sulfur, a $NiCoAlO_2$ alloy, a $NiMnCoO_2$ alloy, or a vanadate.

Example 7

The electrochemical device of Example 6, wherein the first reaction is $Li \leftrightarrow Li^+ + e^-$ and $V_{St}^0$ is about −3.04 V.

Example 8

The electrochemical device of Example 7, wherein the second reaction is $FePO_4+Li^++e^- \leftrightarrow LiFePO_4$ and $E_{cat}^0$ is about 0.36 V.

Example 9

The electrochemical device of Example 7, wherein the second reaction is $Mn_2O_4+Li^++e^- \leftrightarrow LiMn_2O_4$ and $E_{cat}^0$ is about 0.76 V.

Example 10

The electrochemical device of Example 7, wherein the second reaction is $CoO2+Li++e- \leftrightarrow LiCoO2$ and $E_{cat}^0$ is about 0.86 V.

Example 11

The electrochemical device of Example 2, wherein: the first electrode behaves as an anode capable of being oxidized according to a second reaction comprising $Y \leftrightarrow Y^{n+}+ne^-$ having a second standard reduction potential $E_{ano}^0$, Y comprises an element, and $E_{St}^0 < E_{ano}^0$.

Example 12

The electrochemical device of Example 11, wherein Y comprises at least one of carbon, silicon, tin, sodium, zinc, magnesium, vanadium, or $TiO_3$.

Example 13

The electrochemical device of Example 12, wherein the first reaction is $Li \leftrightarrow Li^+ + e^-$ and $E_{St}^0$ is about −3.04 V.

Example 14

The electrochemical device of Example 13, wherein the second reaction is $LiC_6 \leftrightarrow Li^+ + e^- + C$ and $E_{ano}^0$ is about −2.99 V.

Example 15

The electrochemical device of Example 13, wherein the second reaction is $Li_2TiO_3 \leftrightarrow Li^+ + e^- + TiO_3$ and $E_{ano}^0$ is about −1.64 V.

Example 16

The electrochemical device of Example 1, wherein the ion reservoir comprises a solid capable of being reduced according to a first reaction comprising $M + ne^- \leftrightarrow M^{n-}$ having a first standard reduction potential $E_{St}^0$, M is an element, and n is an integer value greater than zero.

Example 17

The electrochemical device of Example 16, wherein the solid comprises at least one halogen.

Example 18

The electrochemical device of Example 16, wherein $M^{n-}$ comprises at least one of $Br^-$, $F^-$, $Cl^-$, or $I^-$.

Example 19

The electrochemical device of Example 16, wherein: the first electrode behaves as a cathode capable of being reduced according to a second reaction comprising $MX + ne^- \leftrightarrow X + M^{n-}$ having a second standard reduction potential $E_{cat}^0$, X comprises an element, and $E_{St}^0 > E_{cat}^0$.

Example 20

The electrochemical device of Example 19, wherein X comprises at least one of bromine or chorine.

Example 21

The electrochemical device of Example 16, wherein: the first electrode behaves as a anode capable of being oxidized according to a second reaction comprising $Y + M^{n-} \leftrightarrow MY + ne^-$ having a second standard reduction potential $E_{cat}^0$, Y comprises an element, and $E_{St}^0 > E_{cat}^0$.

Example 22

The electrochemical device of Example 21, wherein Y comprises at least one of vanadium or bromine.

Example 23

The electrochemical device of Example 1, wherein the regulating element comprises at least one of a resistor or a diode.

Example 24

The electrochemical device of Example 23, wherein the regulating element comprises a resistor and a diode.

Example 25

The electrochemical device of Example 1, wherein the regulating element is positioned in the first circuit between the first electrode and the ion reservoir.

Example 26

The electrochemical device of Example 1, wherein the first electrode and the ion reservoir are fluidly connected by a bridge containing the electrolyte.

Example 27

The electrochemical device of Example 26, wherein the regulating element is positioned within the bridge and limits the flow of ions from the ion reservoir to the first electrode.

Example 28

The electrochemical device of Example 1, wherein the electrolyte comprises at least one $LiPF_6$, $LiBF_4$, or $LiClO_4$ at least partially dissolved in at least one of ethylene carbonate, dimethyl carbonate, or diethyl carbonate.

Example 29

The electrochemical device of Example 1, wherein the first circuit comprises a conductive metal.

Example 30

The electrochemical device of Example 1, further comprising: a second electrode electronically connected to the first electrode by a second circuit, wherein: the electrolyte is positioned between the first electrode and the second electrode, such that the first electrode and the second electrode are ionically connected.

Example 31

A method comprising: transferring ions to an electrode of an electrochemical device, wherein the transferring is accomplished by: electronically and ionically connecting the electrode to an ion reservoir containing the ions, and positioning a regulating element between the electrode and the ion reservoir, wherein: the regulating element limits the flow of the ions from the ion reservoir to the electrode, and the transferring extends the life of the electrochemical device.

Example 32

The method of Example 31, wherein the transferring comprises a continuous flow of ions from the ion reservoir to the electrode.

Example 33

The method of Example 31, wherein the transferring of ions from the reservoir to the electrode is triggered when a set-point for a parameter is attained or when the parameter is in a specific range.

Example 34

The method of Example 33, wherein the parameter comprises at least one of a charge capacity or a voltage.

Example 35

The method of Example 34, wherein the range is less than 2.2 Ah.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. An electrochemical device comprising:
a first electrode;
a second electrode;
a first electrolyte positioned between the first electrode and the second electrode;
a passively triggered ion reservoir comprising a solid active material;
a first circuit;
a second circuit; and
a conduit comprising a second electrolyte and an ionic regulating element, wherein:
the first electrolyte ionically connects the first electrode and the second electrode;
the first circuit electronically connects the first electrode and the second electrode,
the second circuit electronically connects the solid active material and the first electrode,
the second electrolyte ionically connects the solid active material and the first electrode,
the solid active material is not in direct contact with the first electrolyte or the second electrode,
the solid active material is indirectly connected ionically to the second electrode through the second electrolyte, the first electrode, and the first electrolyte,
the solid active material is indirectly connected electronically to the second electrode through the second circuit, the first electrode, and the first circuit, and
the ionic regulating element passively provides a release of an ion to the first electrode.

2. The electrochemical device of claim 1, wherein
the solid active material is capable of being oxidized according to a first reaction comprising $M \leftrightarrow M^{n+} + ne^-$ having a first standard reduction potential $E_{St}^0$,
M is an element,
$M^{n+}$ is the ion, and
n is an integer value greater than zero.

3. The electrochemical device of claim 2, wherein the solid active material comprises at least one of lithium, magnesium, aluminum, potassium, zinc, or vanadium.

4. The electrochemical device of claim 2, wherein $M^{n+}$ comprises at least one of $Li^+$, $Na^+$, $K^+$, $Fe^{3+}$, $Cu^{2+}$, $V^{2+}$, or $Mg^{2+}$.

5. The electrochemical device of claim 2, wherein:
the first electrode behaves as a cathode capable of being reduced according to a second reaction comprising $X + M^{n+} + ne^- \leftrightarrow MX$ having a second standard reduction potential $E_{cat}^0$,
X comprises an element, and
$E_{St}^0 < E_{cat}^0$.

6. The electrochemical device of claim 5, wherein X comprises at least one of $FePO_4$, $FeCl_3$, $Mn_2O_4$, $CoO_2$, sulfur, a $NiCoAlO_2$ alloy, a $NiMnCoO_2$ alloy, or a vanadate.

7. The electrochemical device of claim 6, wherein the first reaction is $Li \leftrightarrow Li^+ + e^-$ and $V_{St}^0$ is about −3.04 V.

8. The electrochemical device of claim 7, wherein the second reaction is $FePO_4 + Li^+ + e^- \leftrightarrow LiFePO_4$ and $E_{cat}^0$ is about 0.36 V.

9. The electrochemical device of claim 2, wherein:
the first electrode behaves as an anode capable of being oxidized according to a second reaction comprising $Y \leftrightarrow Y^{n+} + ne^-$ having a second standard reduction potential $E_{ano}^0$, Y comprises an element, and $E_{St}^0 < E_{ano}^0$.

10. The electrochemical device of claim 9, wherein Y comprises at least one of carbon, silicon, tin, sodium, zinc, magnesium, vanadium, or $TiO_3$.

11. The electrochemical device of claim 10, wherein the first reaction is $Li \leftrightarrow Li^+ + e^-$ and $E_{St}^0$ is about −3.04 V.

12. The electrochemical device of claim 11, wherein the second reaction is $LiC_6 \leftrightarrow Li^+ + e^- + C$ and $E_{ano}^0$ is about −2.99 V.

13. The electrochemical device of claim 1, wherein
the solid active material is capable of being reduced according to a first reaction comprising $M + ne^- \leftrightarrow M^{n-}$ having a first standard reduction potential $E_{St}^0$,
M is an element,
$M^{n-}$ is the ion, and
n is an integer value greater than zero.

14. The electrochemical device of claim 13, wherein:
the first electrode behaves as a cathode capable of being reduced according to a second reaction comprising $MX + ne^- \leftrightarrow X + M^{n-}$ having a second standard reduction potential $E_{cat}^0$,
X comprises an element, and $E_{St}^0 > E_{cat}^0$.

15. The electrochemical device of claim 13, wherein:
the first electrode behaves as an anode capable of being oxidized according to a second reaction comprising $Y+M^{n-} \leftrightarrow MY+n^{e-}$ having a second standard reduction potential $E_{cat}^0$,
Y comprises an element, and $E_{St}^0 > E_{cat}^0$.

16. The electrochemical device of claim 1, wherein the ionic regulating element comprises at least one of a resistor or a diode.

* * * * *